US010922471B2

(12) United States Patent
Baeckler et al.

(10) Patent No.: US 10,922,471 B2
(45) Date of Patent: Feb. 16, 2021

(54) HIGH PERFORMANCE REGULARIZED NETWORK-ON-CHIP ARCHITECTURE

(71) Applicant: Intel Corporation, Santa Clara, CA (US)

(72) Inventors: Gregg William Baeckler, San Jose, CA (US); Martin Langhammer, Alderbury (GB); Sergey Vladimirovich Gribok, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/457,114

(22) Filed: Jun. 28, 2019

(65) Prior Publication Data
US 2019/0318058 A1     Oct. 17, 2019

Related U.S. Application Data

(60) Provisional application No. 62/820,049, filed on Mar. 18, 2019.

(51) Int. Cl.
  *G06F 30/30*     (2020.01)
  *G06F 30/398*    (2020.01)
  (Continued)

(52) U.S. Cl.
  CPC ............ *G06F 30/398* (2020.01); *G06F 30/34* (2020.01); *G06F 30/392* (2020.01)

(58) Field of Classification Search
  CPC . H04L 29/06; G06F 2209/509; G06F 9/5027; G06F 9/505; G06F 9/5072;
  (Continued)

(56) References Cited

U.S. PATENT DOCUMENTS

| | | | |
|---|---|---|---|
| 2010/0158023 A1* | 6/2010 | Mukhopadhyay .. | G06F 15/7825 370/401 |
| 2010/0191911 A1* | 7/2010 | Heddes ................... | G06F 15/16 711/118 |
| 2017/0193142 A1* | 7/2017 | Boutillier ................ | G06F 30/18 |

OTHER PUBLICATIONS

Andrew Bitar, Mohamed S. Abdelfattah, and Vaughn Betz, Bringing Programmability to the Data Plane: Packet Processing with a NoC-Enhanced FPGA, 2015 International Conference on Field Programmable Technology (FPT), Dec. 2015, pp. 24-31.

(Continued)

*Primary Examiner* — Binh C Tat
(74) *Attorney, Agent, or Firm* — Fletcher Yoder, P.C.

(57) ABSTRACT

Techniques for designing and implementing networks-on-chip (NoCs) are provided. For example, a computer-implemented method for programming a network-on-chip (NoC) onto an integrated circuit includes determining a first portion of a plurality of registers to potentially be included in a NoC design, determining routing information regarding datapaths between registers of the first portion of the plurality of registers, and determining an expected performance associated with the first portion of the plurality of registers. The method also includes determining whether the expected performance is within a threshold range, including the first portion of the plurality of registers and the datapaths in the NoC design after determining that the expected performance is within the threshold range, and generating instructions configured to cause circuitry corresponding to the NoC design to be implemented on the integrated circuit.

20 Claims, 18 Drawing Sheets

(51) Int. Cl.
*G06F 30/34* (2020.01)
*G06F 30/392* (2020.01)

(58) Field of Classification Search
CPC ...... G06F 1/3212; G06F 1/324; G06F 1/3287;
G06F 21/316; G06F 21/566; G06F
2221/2133; G06F 9/5094; G06F 16/2456;
G06F 16/24578; G06F 16/90344; G06F
21/121; G06F 21/552; G06F 21/554;
G06F 21/577; G06F 21/645; G06F 21/85;
G06F 30/34; G06F 30/392; G06F 30/394;
G06F 30/398; G06F 8/36; G06F 9/45512;
G06F 9/45529; H04W 8/26; G06N 3/04;
G06N 3/049; G06N 3/08
USPC .................................................. 716/117–125
See application file for complete search history.

(56) References Cited

OTHER PUBLICATIONS

Andrew Putnam et al., A Reconfigurable Fabric for Accelerating Large-Scale Datacenter Services, Proceeding of the 41st Annual International Symposium on Computer Architecuture, ser. ISCA '14. Piscataway, NJ, USA: IEEE Press, 2014, pp. 13-24.
Andrew Bitar, Building Networking Applications from a NoC-Enhanced FPGA, University of Toronto, Toronto, Canada, Nov. 2015.
Ian Kuon and Jonathan Rose, Measuring the Gap between FPGAs and ASICs, IEEE Transactions on Computer-Aided Design of Integrated Circuits and Systems, vol. 26, No. 2, pp. 203-215, Feb. 2007.
Kshitij Bhardwaj, On Multicast in Asynchronous Networks-on-Chip: Techniques, Architectures, and FPGA Implementation, Columbia University, New York City, US, Oct. 2018.
Kees Vissers Fellow, Versal: The New Xilinx Adaptive Compute Acceleration Platform (ACAP) in 7nm, 2019 aCM/SIGDA International Symposium on Field-Programmable Gate Arrays, Feb. 25, 2019.
Michael K. Papamichael and James C. Hoe, CONNECT: Re-Examining Conventional Wisdom for Designing NoCs in the Context of FPGAs, Proceedings of the ACM/SIGDA International Symposium on Field Programmable Gate Arrays, ser. FPGA '12, pp. 37-46, Monterey, California, USA, Feb. 22-24, 2012.
Martin Langhammer, Gregg Baeckler, and Sergey Gribok, Fractal Synthesis:—Invited Tutorial -. In the 2019 ACM/SIGDA International Symposium on Field-Programmable Gate Arrays (FPGA '19), Feb. 24-26, 2019, New York, NY, USA.
Mohamed S. Abdelfattah and Vaughn Betz, Design Tradeoffs for Hard and Soft FPGA-based Networks-on-Chip, 2012 International Conference on Field-Programmable Technology, Dec. 2012, pp. 95-103.
Mohamed S. Abdelfattah, Andrew Bitar, and Vaughn Betz, Design and Applications for Embedded Networks-on-Chip on FPGAs, IEEE Transactions on Computers, vol. 66, No. 6, pp. 1008-1021, Jun. 2017.
Nachiket Kapre and Jan Gray, Hoplite: A Deflection-Routed Directional Torus NoC for FPGAs, ACM Transactions on Reconfigurable Technology and Systems, vol. 1, No. 2, Article 3, Apr. 2016.
Nachiket Kapre and Jan Gray, Hoplite Building Austere Overlay NoCs for FPGAs, 2015 25th International Conference on Field Programmable Logic and Applications (FPL), Sep. 2015.
Nachiket Kapre and Tushar Krishna, FastTrack: Leveraging Heterogeneous FPGA Wires to Design Low-cost High-performance Soft NoCs, 2018 ACM/IEEE 45th Annual International Symposium on Computer Architecture (ISCA), Jun. 2018, pp. 739-751.

\* cited by examiner

US 10,922,471 B2

HIGH PERFORMANCE REGULARIZED NETWORK-ON-CHIP ARCHITECTURE

CROSS REFERENCE TO RELATED APPLICATIONS

This application claims priority from and benefit of U.S. Provisional Application Ser. No. 62/820,049, filed Mar. 18, 2019, entitled "High Performance Regularized Network-on-Chip Architecture," which is hereby incorporated by reference in its entirety for all purposes.

BACKGROUND

This disclosure generally relates to integrated circuits, such as field-programmable gate arrays (FPGAs). More particularly, the present disclosure relates the design and implementation of networks-on chip (NoCs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuits can be utilized to perform various functions, such as encryption and machine learning. Moreover, various portions of integrated circuits may be utilized to perform various operations. For example, one portion of an integrated circuit may perform one function to data, and another portion of the integrated circuit may be utilized to further process the data. NoCs may be utilized to route communication between different portions of an integrated circuit or for communication between multiple integrated circuits. For example, soft NoCs may be generated by software utilized to program an integrated circuit. However, soft NoCs may perform inconsistently, operate at relatively low speeds, and be unable to route wide busses across long spans of the integrated circuit. Moreover, it may be difficult to control the distribution of relatively small numbers of bits of data across an integrated circuit using soft NoCs.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
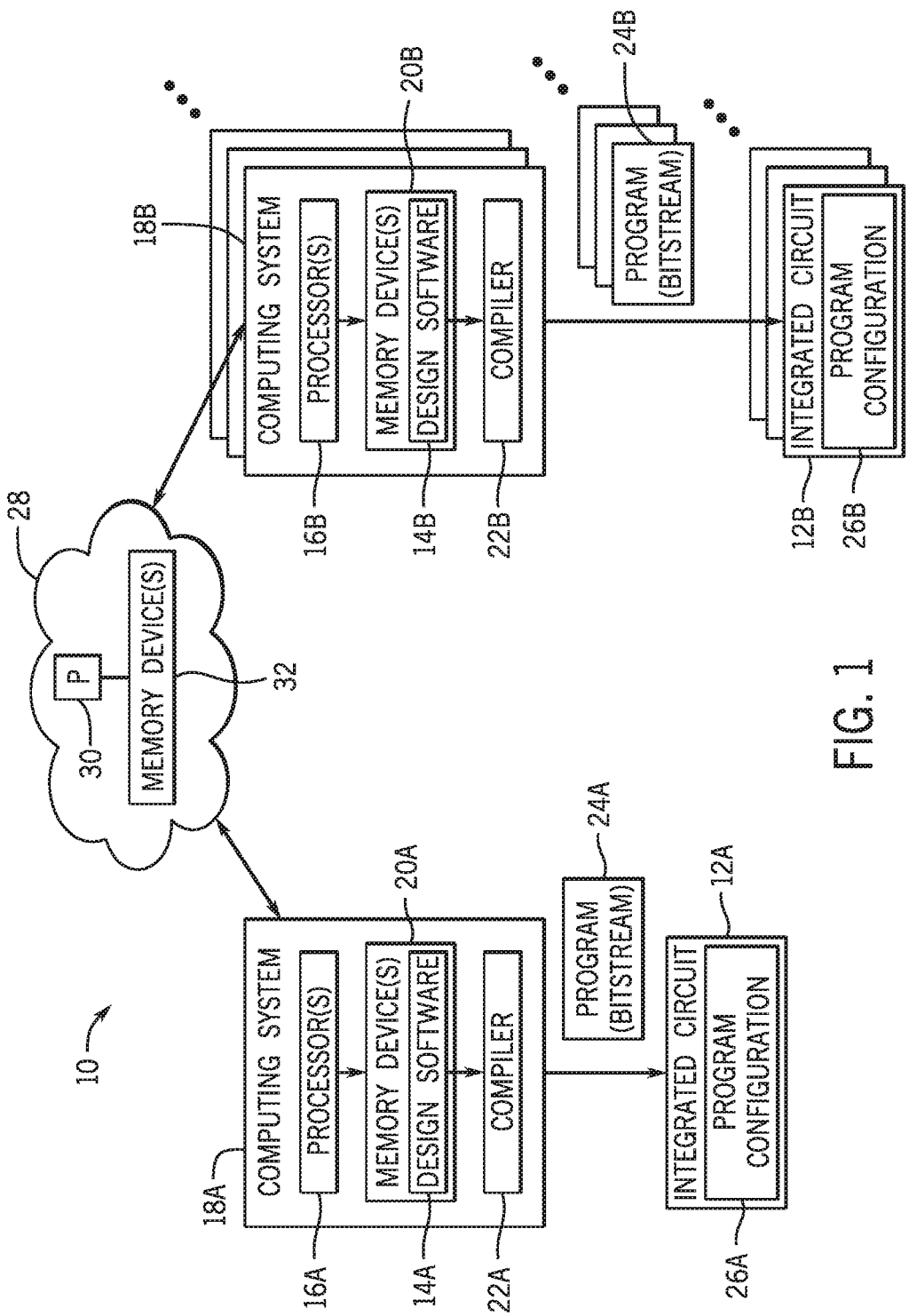
FIG. 1 is a block diagram of a system for programming networks-on-chip (NoCs) onto integrated circuits, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Integrated circuits, such as programmable logic devices, may be used to perform a variety of functions. In many cases, different portions of an integrated circuit may be used to perform operations in a function. For example, one portion of an integrated circuit may receive data, perform a first operation to the data, and send the data to another portion of the integrated circuit. The other portion of the integrated circuit may then perform another function on the data. Similarly, multiple integrated circuits may be utilized to perform functions. For instance, one operation of an operation may be performed by one integrated circuit. The data may then be send to another integrated circuit, which may perform a subsequent operation on the data.

The movement of data and pathways data can utilize across an integrated circuit are important to the overall performance of the integrated circuit. Some integrated circuits, including programmable logic devices such as field programmable gate arrays (FPGAs), may utilize a network-on-chip (NoC) to help facilitate the transportation of data across an integrated circuit. For example, a NoC may be utilized when routing data from one portion (e.g., sector or accelerator functional unit (AFU)) of the integrated circuit to another portion of the same integrated circuit or to another integrated circuit.

Soft NoCs, which can be designed by software that is utilized to program an integrated circuit, may be designed and implemented onto integrated circuits. In other words, a circuit designer may utilize software to generate a NoC that will be implemented on an integrated circuit. However, in many cases though, soft NoCs are limited in performance. For example, soft NoCs may perform inconsistently, operate at relatively low speeds, and be unable to route wide busses across long spans of an integrated circuit. Moreover, it may be difficult to control the distribution of relatively small numbers of bits of data across an integrated circuit using soft NoCs. Furthermore, as a circuit design is modified (e.g., through compiling multiple iterations of a circuit design), it may be difficult to provide a NoC that meets a circuit designer's desired characteristics while also allowing the integrated circuit to perform a function desired by the circuit designer. In other words, optimizing the performance of a NoC as well as enabling a portion of an integrated circuit to perform a function as intended may prove to be unfeasible.

The present disclosure is directed to techniques for designing and generating high-performance soft NoCs. For example, as discussed below, a regularized approach may be undertaken to provide a NoC for an integrated circuit that operates according to a designer's desired settings, can be designed before compiling, and enables large amounts of data to be transported.

With the foregoing in mind, FIG. 1 illustrates a block diagram of a system 10 that may be used to program one or more integrated circuit device 12 (e.g., integrated circuit devices 12A, 12B). The integrated circuit device 12 may be reconfigurable (e.g., FPGA) or may be an application-specific integrated circuit (ASIC). A user may implement a circuit design to be programmed onto the integrated circuit device 12 using design software 14, such as a version of Quartus by Intel®.

The design software 14 may be executed by one or more processors 16 of a respective computing system 18. The computing system 18 may include any suitable device capable of executing the design software 14, such as a desktop computer, a laptop, a mobile electronic device, a server, or the like. The computing system 18 may access, configure, and/or communicate with the integrated circuit device 12. The processor(s) 16 may include multiple microprocessors, one or more other integrated circuits (e.g., ASICs, FPGAs, reduced instruction set processors, and the like), or some combination of these.

One or more memory devices 20 may store the design software 14. In addition, the memory device(s) 20 may store information related to the integrated circuit device 12, such as control software, configuration software, look up tables, configuration data, etc. In some embodiments, the processor(s) 16 and/or the memory device(s) 20 may be external to the computing system 18. The memory device(s) 20 may include a tangible, non-transitory, machine-readable-medium, such as a volatile memory (e.g., a random access memory (RAM)) and/or a nonvolatile memory (e.g., a read-only memory (ROM)). The memory device(s) 20 may store a variety of information that may be used for various purposes. For example, the memory device(s) 20 may store machine-readable and/or processor-executable instructions (e.g., firmware or software) for the processor(s) 16 to execute, such as instructions to determine a speed of the integrated circuit device 12 or a region of the integrated circuit device 12, determine a criticality of a path of a design programmed in the integrated circuit device 12 or a region of the integrated circuit device 12, programming the design in the integrated circuit device 12 or a region of the integrated circuit device 12, and the like. The memory device(s) 20 may include one or more storage devices (e.g., nonvolatile storage devices) that may include read-only memory (ROM), flash memory, a hard drive, or any other suitable optical, magnetic, or solid-state storage medium, or any combination thereof.

The design software 14 may use a compiler 22 to generate a low-level circuit-design program 24 (bitstream), sometimes known as a program object file, which programs the integrated circuit device 12. That is, the compiler 22 may provide machine-readable instructions representative of the circuit design to the integrated circuit device 12. For example, the integrated circuit device 12 may receive one or more programs 24 as bitstreams that describe the hardware implementations that should be stored in the integrated circuit device 12. The programs 24 (bitstreams) may programmed into the integrated circuit device 12 as a program configuration 26.

As illustrated, the system 10 also includes a cloud computing system 28 that may be communicatively coupled to the computing systems 18, for example, via the internet or a network connection. The cloud computing system 28 may include processing circuitry 30 and one or more memory devices 32. The memory device(s) 32 may store information related to the integrated circuit device 12, such as control software, configuration software, look up tables, configuration data, etc. The memory device(s) 32 may include a tangible, non-transitory, machine-readable-medium, such as a volatile memory (e.g., a random access memory (RAM)) and/or a nonvolatile memory (e.g., a read-only memory (ROM)). The memory device(s) 32 may store a variety of information that may be used for various purposes. For example, the memory device(s) 32 may store machine-readable and/or processor-executable instructions (e.g., firmware or software) for the processing circuitry 30 to execute. Additionally, the memory device(s) 32 of the cloud computing system 28 may include programs 24 and circuit designs previously made by designers and the computing systems 18. The memory device(s) 32 may also include one or more libraries of chip-specific predefined locations and fixed routes that may be utilized to generate a NoC. When a designer is utilizing the design software 14, the processor(s) 16 may request information regarding NoCs previously designed by other designers or implemented on other integrated circuit device 12. For instance, a designer who is working on programming the integrated circuit device 12A may utilize the design software 14A and processor(s) 16A to request a design for a NoC used on another integrated circuit (e.g., integrated circuit device 12B) from the cloud computing system 28. The processing circuitry 30 may generate and/or retrieve a design of a NoC from the memory devices(s) 32 and provide the design to the computing system 18A. Additionally, the cloud computing system 28 may provide information regarding the predefined locations and fixed routes for a NoC to the computing system 18A based on the specific integrated circuit device 12A (e.g., a particular chip). Furthermore, the memory device(s) 32 may keep records and/or store designs that are used to provide NoCs with regularized structures, and the processing circuitry 30 may select specific NoCs based on the integrated circuit device 12A as well as design considerations of the designer (e.g., amounts of data to be transferred, desired speed of data transmission).

Figure 2:
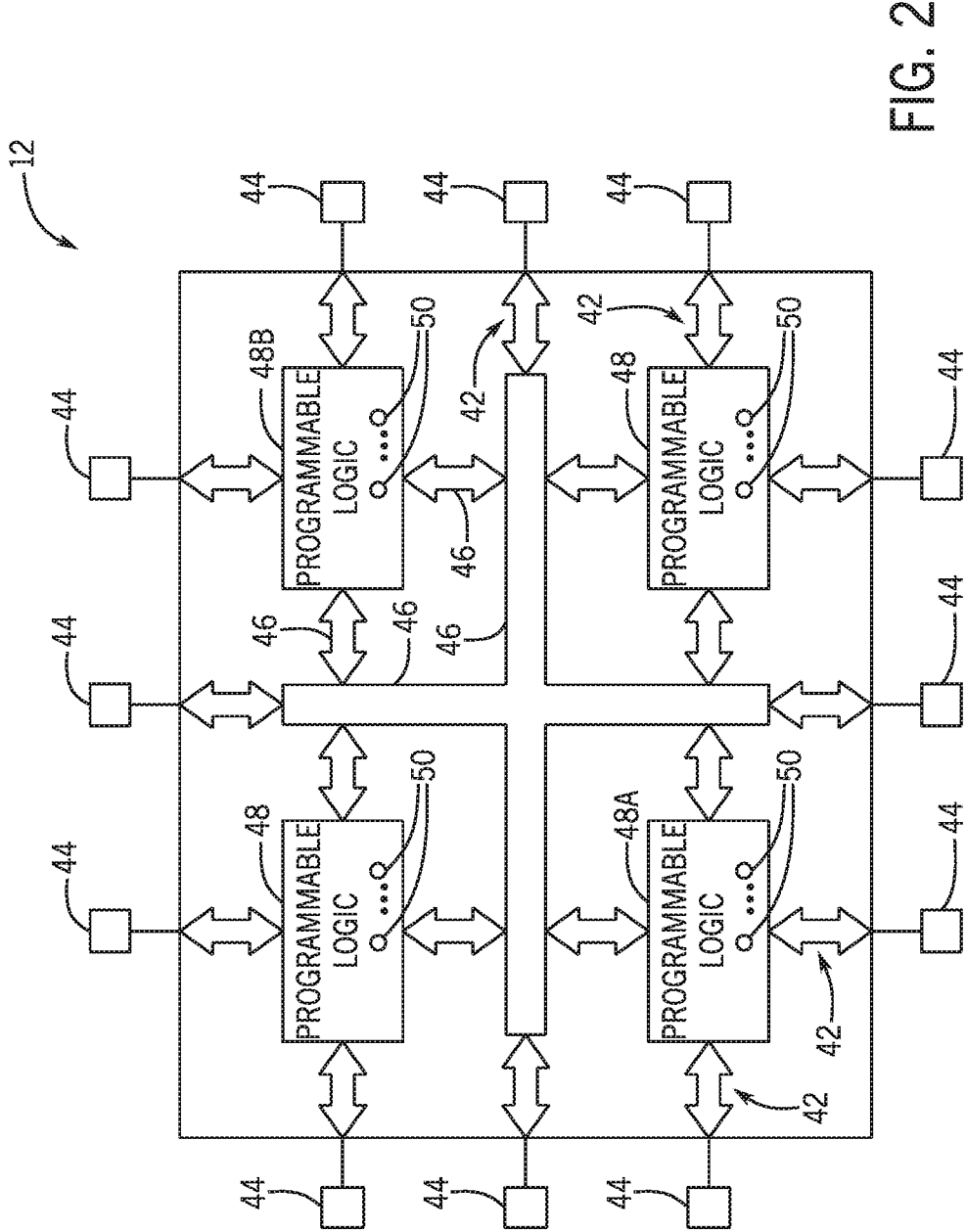
FIG. 2 is a block diagram of an integrated circuit in which a NoC may be implemented, in accordance with an embodiment.

Turning now to a more detailed discussion of the integrated circuit device 12, FIG. 2 illustrates an example of the integrated circuit device 12 as a programmable logic device, such as a field-programmable gate array (FPGA). Further, it should be understood that the integrated circuit device 12 may be any other suitable type of programmable logic device (e.g., an application-specific integrated circuit and/or application-specific standard product). As shown, integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (i.e., programmable connections between respective fixed interconnects), such as the soft NoCs disclosed herein. Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as integrated circuit device 12, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Furthermore, it should be noted that the programmable logic 48 may correspond to different portions or sectors on the integrated circuit device 12. That is, the integrated circuit device 12 may be sectorized, meaning that programmable logic resources may be distributed through a number of discrete programmable logic sectors (e.g., each programmable logic 48). In some cases, sectors may be programmed to perform specific tasks. For example, a first sector (e.g., programmable logic 48A) may perform a first operation on data. The interconnect resources 46, which may include a NoC designed using the design software 14, may be utilized to provide the data to another sector (e.g., programmable logic 48B), which may perform further operations on the data. As discussed below, the soft NoC may provide a regularized, predictable way to provide large amounts of data between computing elements (e.g., between different portions of the programmable logic 48).

Figure 3:
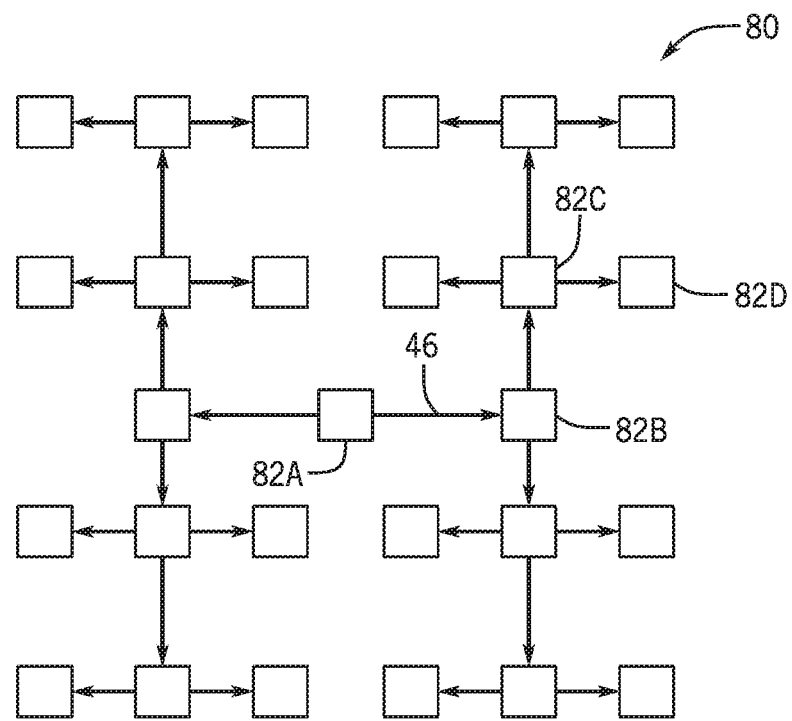
FIG. 3 is a block diagram of a clock distribution network, in accordance with an embodiment.

Continuing with the drawings, FIG. 3 provides a block diagram of a clock distribution network 80. The clock distribution network 80, which may be called an "H tree," is representative of communication between different portions 82 of the integrated circuit device 12. For example, the portions 82 may be representative of sectors of programmable logic 48 or portions of the programmable logic 48 within a single sector (e.g., programmable elements 50 or groups of programmable elements 50). Generally speaking, data may be propagated from one portion 82 of the integrated circuit device 12 to a neighboring portion 82. This may repeat a number of times until data is provided to a target destination. For example, data may be sent from portion 82A to portion 82B to portion 82C to portion 82D in order to transfer data from the portion 82A to the portion 82D.

A NoC may be designed based on the clock distribution network 80. Such a NoC may be said to be designed based on "optimization" in the sense that the NoC may be generated to provide a route that enables data to be transferred as quickly as possible between certain points of the integrated circuit device 12. However, in such as NoC, a portion of the pathway will be rate-limiting, meaning that there will be some point in the pathway at which the data is transmitted the slowest. For instance, in the case that the portions 82 correspond to different regions or sectors of the programmable logic 48, various portions of the interconnection resources 46 may be composed of different numbers of wires and/or registers. Part of the interconnection resources 46, such as where fewer wires are utilized and/or data is transmitted less frequently, may serve as a bottleneck to the speed at which data can be transmitted from one portion 82 to another portion 82 of the integrated circuit device 12. Moreover, in certain types of integrated circuit devices 12, such as FPGAs, the integrated circuit device 12 may be a regularized structure in which data does not originate from a "central" location. For example, data may be generated from programmable logic 48 located in a corner of the integrated circuit device 12. Thus, the clock distribution network 80 may be said to attempt to optimize the overall cost of the entire network (e.g., the entire clock distribution network 80), which may result in the inability to send desired amounts of data at a desired speed.

Figure 4:
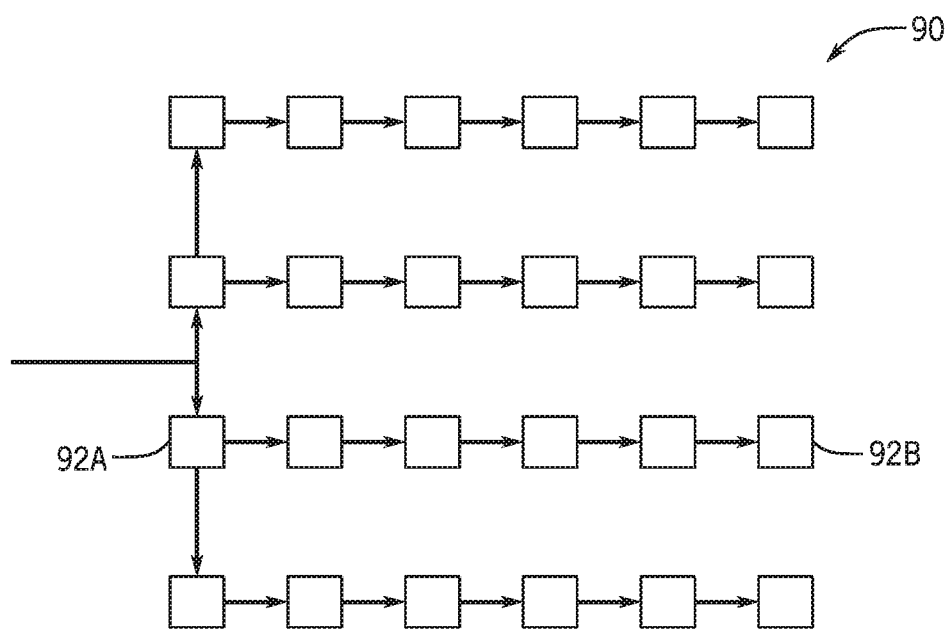
FIG. 4 is a block diagram of a regularized clock distribution network, in accordance with an embodiment.

As discussed herein, a "regularized" approach is taken to designing and implementing NoCs (e.g., as part of the interconnection resources 46) on the integrated circuit device 12. That is, rather than emphasizing optimization as the clock distribution network 80 does, emphasis instead be placed on regularized NoC architectures that can be provided for the integrated circuit device 12. For example, the NoCs discussed herein may be regularized for a particular integrated circuit device (e.g., a specific model or chip). Bearing this in mind, FIG. 4 is a block diagram of another clock distribution network 90 that follows a regularization approach. In particular, the clock distribution network 90 is a unidirectional network in which communication from one portion 92 (e.g., portion of programmable logic 48) of the integrated circuit device 12 to another portion 92 is optimized for a single direction. For example, communication from portion 92A to 92B may be optimized by providing a specific bandwidth (e.g., number of wires multiplied by frequency) between the portion 92A and the portion 92B.

Figure 5:
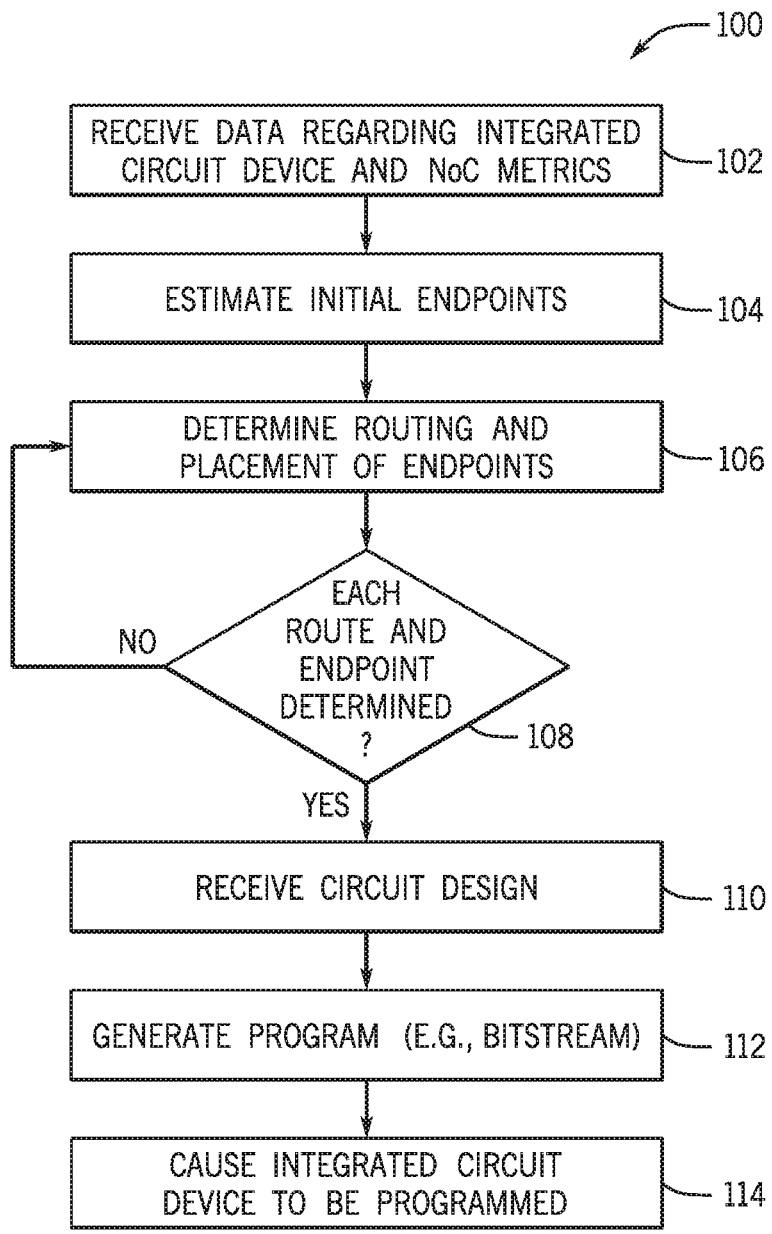
FIG. 5 is a flow diagram of a process for implementing a NoC on an integrated circuit, in accordance with an embodiment.

With the foregoing in mind, FIG. 5 is flow diagram of a process 100 for implementing a NoC on an integrated circuit device. For example, the processor(s) 16A of the computing system 18A may perform the process 100 to a NoC onto the integrated circuit device 12A. Additionally, the process 100 may be performed by the computing system 18A in combination with the cloud computing system 28. The process 100 generally includes receiving data regarding the integrated circuit device 12A and NoC metrics (process block 102), estimating initial endpoints, which may also be referred to as "source points" (process block 104), determining routing and placement of endpoints (process block 106), determining whether each route and endpoint has been determined (decision block 108), and determining routing and placement of endpoints upon determining that some routes or endpoints have not been determined (process block 106). When it is determined that each route and endpoint has been determined, the process 100 also includes receiving a circuit design (process block 110), generating the program (bitstream) 24A (process block 112), and causing the integrated circuit device 12A to be programmed (process block 114).

At process block 102, the computing system 18A may receive information regarding the integrated circuit device 12A as well as metrics associated with a NoC to be developed and implemented onto the integrated circuit device 12A. The information may be received from the cloud computing system 28. The information regarding the integrated circuit device 12A may include information regarding the particular integrated circuit device 12A, such as a particular model of the integrated circuit device 12A (e.g., a specific chip), as well as characteristics associated with the particular integrated circuit device 12A. The metrics associated with the NoC may include bus width (e.g., number of wires), bus speed (e.g., a value in hertz), a target performance level, and a target performance level threshold range. Some of the NoC metrics may be received from the cloud computing system 28. For example, bus width and bus speed may be information specific to a particular type of the integrated circuit device 12A that may be stored on the memory device(s) 32. Additionally, the target performance level and target performance level threshold range may be received via a user input from designer utilizing the design software 14A. In other embodiments, the processor(s) 16A may determine the target performance level and the target performance level threshold range. For instance, a default number or percentage may be used to determine the target performance level threshold range. For example, if the target performance level is the 600 megahertz (MHz), the threshold range may be defined by a specific amount above or below 600 MHz, such as 580-620 MHz (i.e., within 20 MHz of 600 MHz). Keeping the same example of the target performance level being 600 MHZ, the target performance level threshold range may be defined by a specific percentage above or below 600 MHz, such as 570-630 MHz (i.e., within five percent of 600 MHz). Additionally, the designer may set the target performance level threshold range based on an amount (e.g., a number of megahertz) or a percentage value (e.g., five percent).

Figure 6:
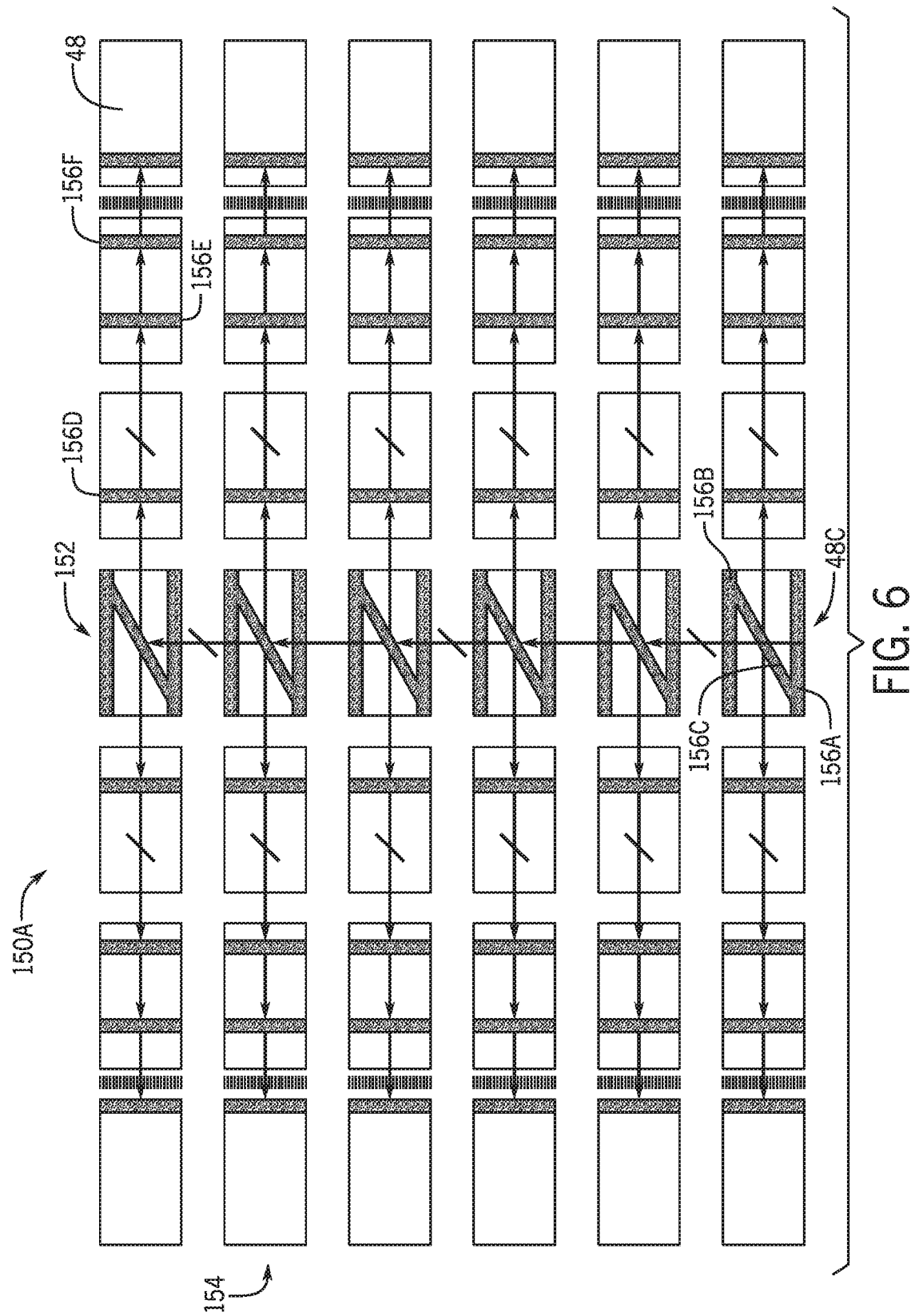
FIG. 6 is a diagram of a NoC, in accordance with an embodiment.

At process block 104, the computing system 18A may estimate endpoints for the NoC. As an example, endpoints may include registers (e.g., register blocks) that are relatively close to, or neighbor, points between a data source (e.g., a portion of programmable logic 48 where data originates) and a destination (e.g., another portion of the programmable logic 48 where the data is to be sent). As another example, the endpoints may refer to a "spine" (e.g., a column) of registers from which "ribs" (e.g., rows) of registers will subsequently be generated. To help elaborate, FIG. 5 is provided. In particular, FIG. 6 is a diagram of a NoC 150A that the computing system 18 generate and implement on the integrated circuit device 12A by performing the process 100. As illustrated, the NoC 150A includes a rib 154, which generally refers to a column of sectors, regions, or portions of programmable logic 48 that may be utilized to provide data vertically (e.g., in an outbound direction to other portions of programmable logic 48 included in the spine 152) and horizontally (e.g., to ribs 154). As illustrated, the ribs 154 may run parallel to one another and perpendicular to the spine 152.

As illustrated, the register blocks 156 may be utilized to route data through the NoC 150A to a desired location (e.g., from one portion of the programmable logic 48 to another portion of the programmable logic 48). In particular, register blocks 156A, 156B may be utilized to send data vertically, for example, to other portions of the programmable logic 48 included in the rib 154. The register blocks 156C, 156D, 156E, 156F may send data horizontally.

In the illustrated embodiment, the NoC 150A includes 512 bit busses implemented via register blocks 156 that are routed at 600 MHz across the integrated circuit device 12A, such as embodiments in which the integrated circuit device 12A is a programmable logic device (e.g., an FPGA). Using the illustrated approach, there is a fairly uniform distribution of performance achieved across the entire NoC 150A. For example, the spread in speed from the slowest to fastest routes in the NoC 150A may be approximately five percent (e.g., zero to ten percent). Such uniformity may be achieved even though the NoC 150A may include different amounts of distance between register blocks 156. For example, as illustrated, there is a greater distance between register block 156D and register block 156E compared to the distance between register block 156E and register block 156F. Placement of register blocks that are not included in the spine 150, such as register blocks 156D, 156E, 156F are discussed below in greater detail with respect to FIG. 11.

As also illustrated in FIG. 6, each sector of the programmable logic 48, such as programmable logic 48C, includes three register blocks 156A, 156B, 156C that form a "Z" shape. The arrangement of registers within the programmable logic 48C and register blocks 156A, 156B, 156C is discussed below. However, before proceeding to discuss the programmable logic 48C, it should be noted that the spine 150 may not be located in a center position (e.g., a centrally located column of programmable logic 48 sectors) in other embodiments. Moreover, while the spine 150 is illustrated as running vertically, in other embodiments, the spine 150 may run horizontally. In embodiments in which the spine 150 runs horizontally, the ribs 154 may run vertically. That is, the spine 150 may still send data horizontally and vertically, but the ribs 154 would be utilized to send data vertically.

Figure 7:
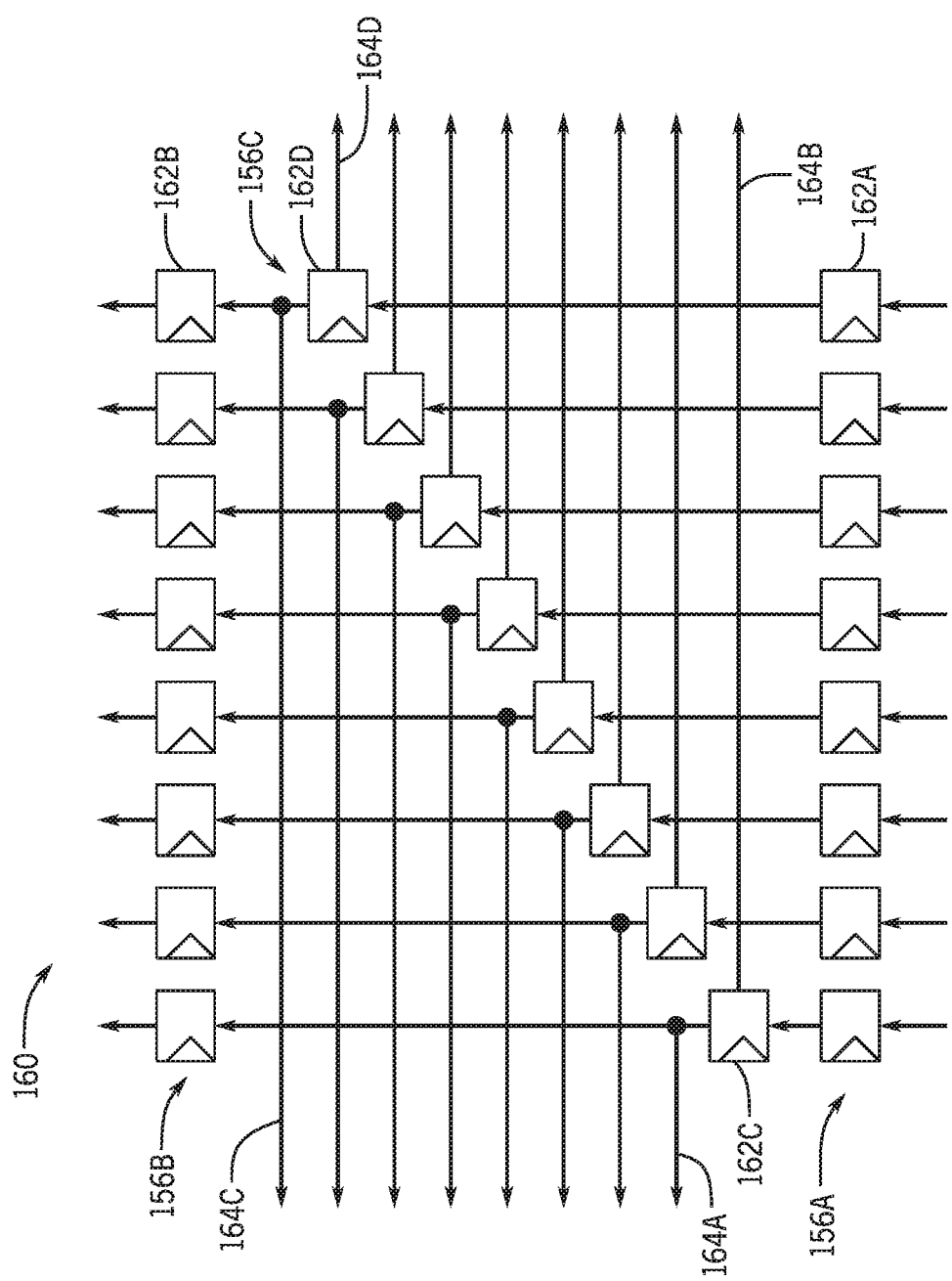
FIG. 7 is a diagram of portion of the NoC of FIG. 6, in accordance with an embodiment.

Continuing with the drawings, FIG. 7 is a diagram of a portion 160 of the NoC 150A that is located on the programmable logic 48C. More particularly, FIG. 7 illustrates registers 162 of the register blocks 156A, 156B, 156C included in the NOC 150A. Registers 162A, 162B may be utilized to send data vertically along the spine, while registers 162C may send data horizontally. Utilizing a diagonal set of registers (e.g., register block 156C) may also enable datapath distances associated with each register 162 of the register block 156 to be approximately equivalent. For instance, a first total distance (e.g., sum) of datapaths (e.g., wires) 164A, 164B associated with register 162C is equal to a second total distance (e.g., sum) of datapaths 164C, 164D associated with register 162D (or the corresponding datapaths of any other register 162 in the register block 156C). Because the total distances of the datapaths associated with each register are approximately equivalent, data may be transmitted at approximately equivalent speeds by the registers 162 of the register block 156C.

Figure 8:
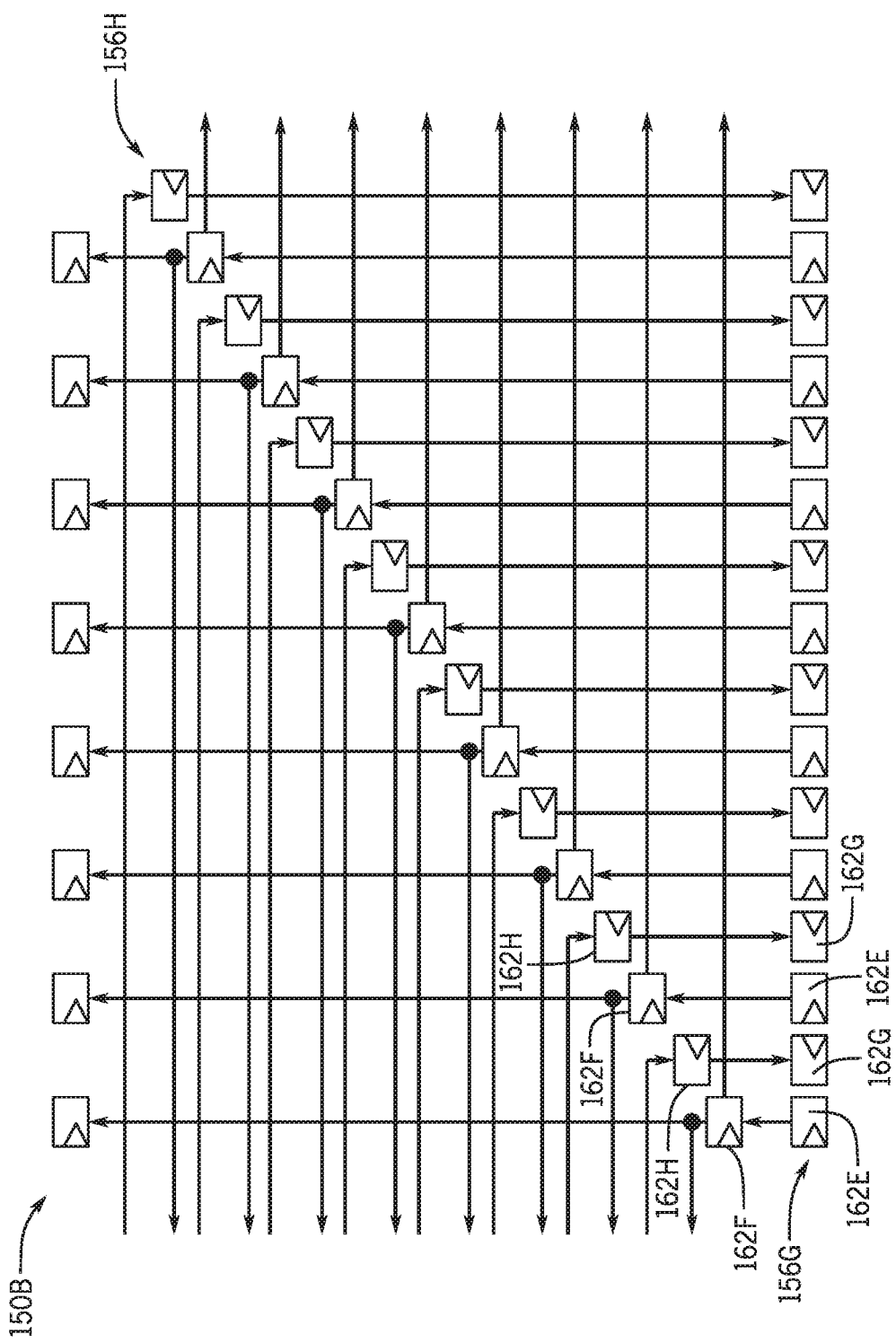
FIG. 8 is a diagram of a portion of a bidirectional NoC, in accordance with an embodiment.

While FIG. 6 and FIG. 7 relate to a unidirectional NoC (e.g., NoC 150A), in other embodiments, NoCs generated by the computer system 18A and cloud computing system 28 may be bidirectional. In other words, while the register blocks 156A, 156B are only utilized to transmit data in one direction (e.g., upwards), register blocks may be used to send data both upwards and downwards. For example, FIG. 8 is a diagram of a portion of a bidirectional NoC 150B that may be generated by following the process 100 and included as part of the spine 152. As illustrated, alternating registers of register blocks 156G, 156H are utilized to provide data in one direction. For instance, registers 162E of the register block 156G and registers 162F of the register block 156H may be utilized to transmit data upwards (e.g., outbound from a data source). Additionally, registers 162G of the register block 156I and registers 162H of the register block 156J may transmit data downwards (e.g., inbound to a data source).

Figure 9:
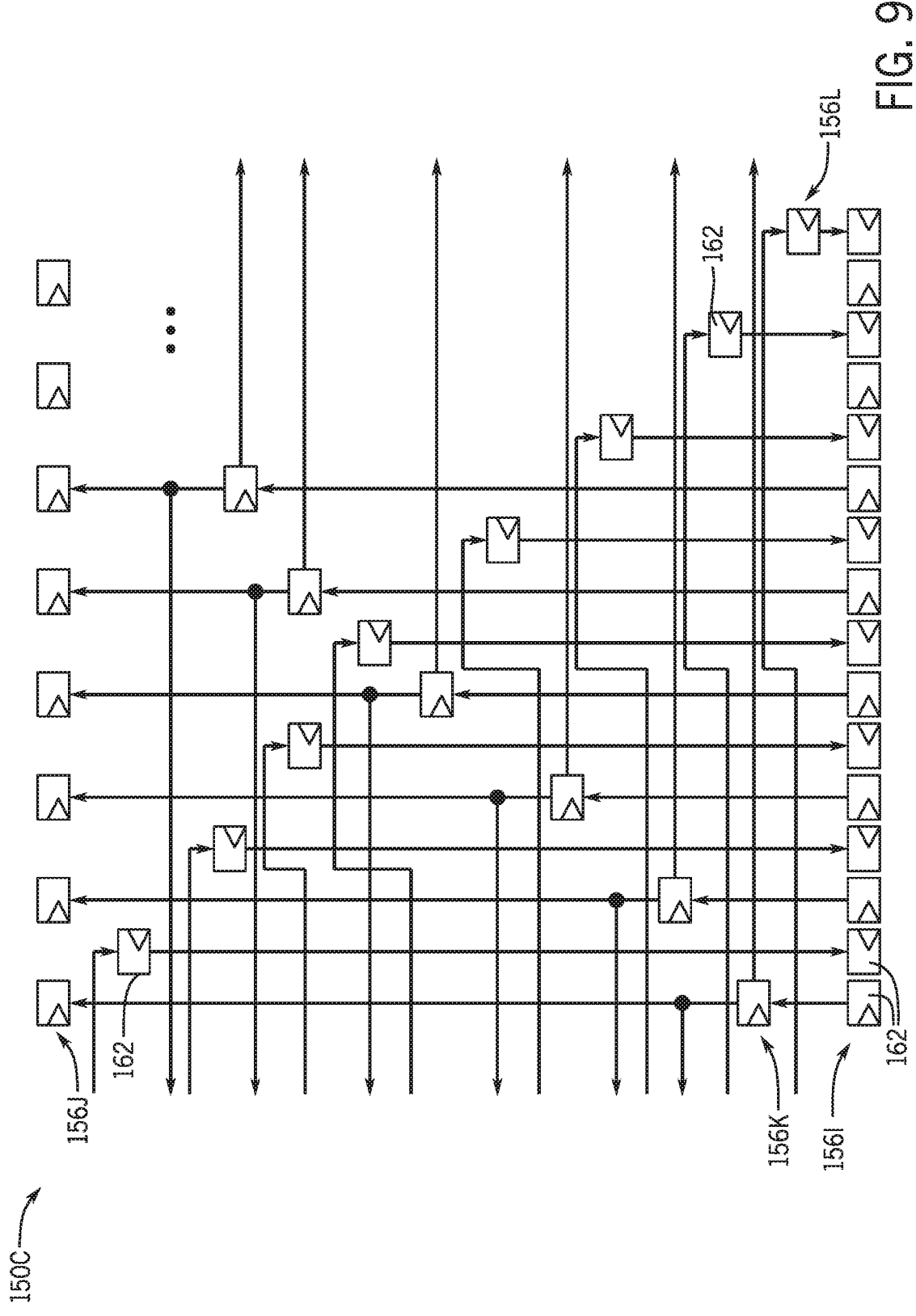
FIG. 9 is a diagram on another bidirectional NoC, in accordance with an embodiment.

While FIGS. 6-8 are generally directed to "Z" configurations of register blocks, in other embodiments, other configurations may be used. For example, FIG. 9 is a diagram of another embodiment of a portion of a bidirectional NoC 150C that may be generated by following the process 100 and included as part of the spine 152. As illustrated, the NoC 150C utilized an "X" configuration that includes two horizontal register blocks 156I, 156J and two diagonal register blocks 156K, 156L. Some of the registers 162 of the register block 156I may be utilized to send data away from a data source, while other registers 162 of the register block 156I may be utilized to send data towards to data source. For example, every other register 162 in the register block 156I may send data in a particular direction, and adjacent registers 162 may be used to send data in the opposite direction. Registers 162 included in the register block 156K may be utilized to send data in one direction (e.g., outbound), while registers 162 included in the register block 156L may send data in another direction (e.g., inbound).

Figure 10:
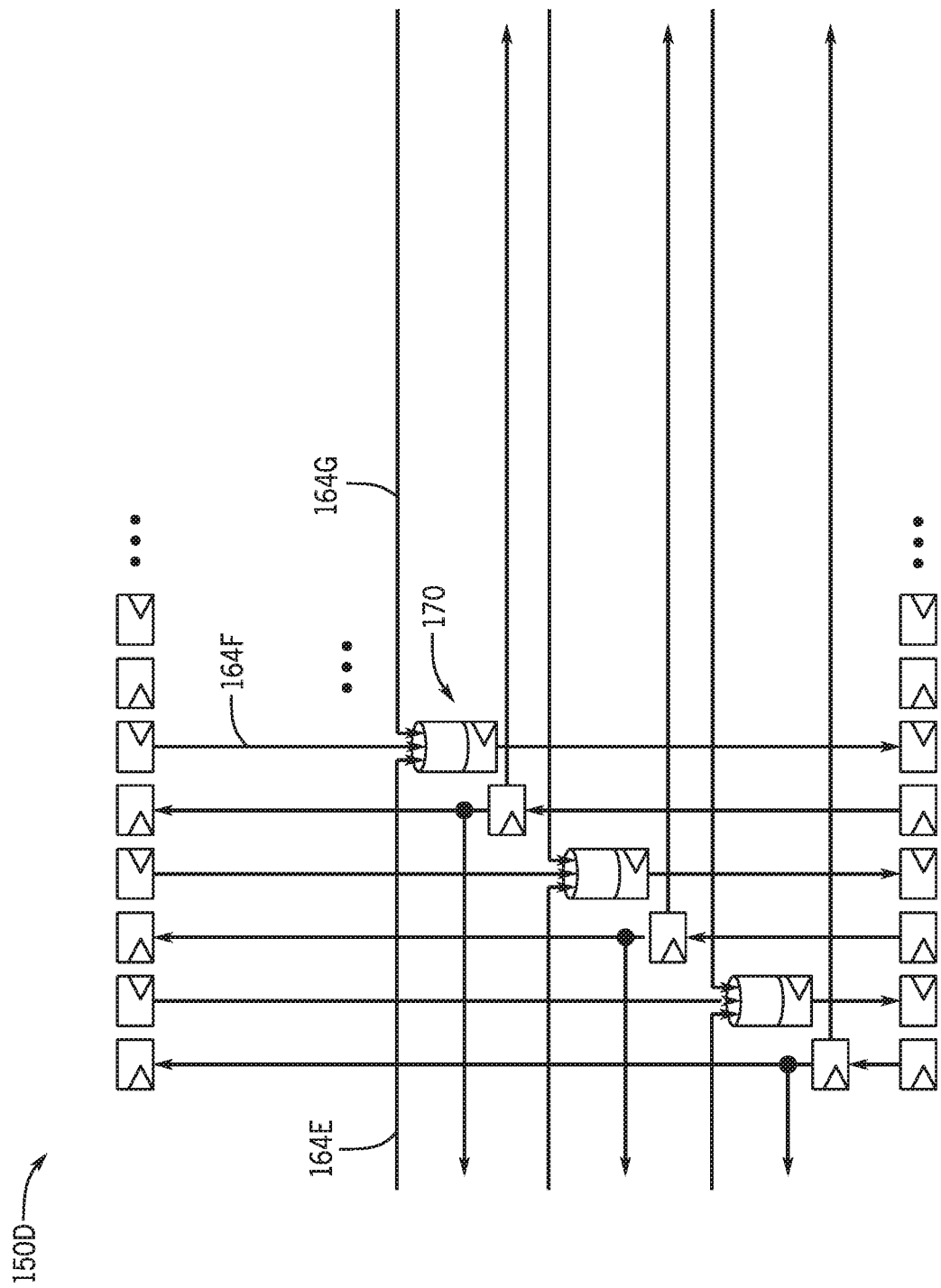
FIG. 10 is a diagram of portion of a NoC that includes gated datapaths, in accordance with an embodiment.

Continuing with the discussion of different embodiments of NoCs, FIG. 10 is a diagram of a portion of a NoC 150D that may also be generated by following the process 100 and included as part of the spine 152. In particular, the NoC 150D includes gated datapaths. For instance, the NoC 150D includes converging datapaths, such as datapaths 164E, 164F, 164G converge at a gate router 170 (e.g., an OR gate router or other logic gate router) that is communicatively coupled to a register 162. The gate router 170 may perform a logic operation on inputs received via the datapaths 164E, 164F, 164G and transmit data. For example, the gate router 170 may combine signals received via the datapaths 164E, 164F, 164G and send a combined signal inbound (e.g., towards a data source). Utilizing gate routers such as the gate router 170 may prevent data packets from colliding as well as enable converging datapaths without utilizing data buffers.

Figure 11:
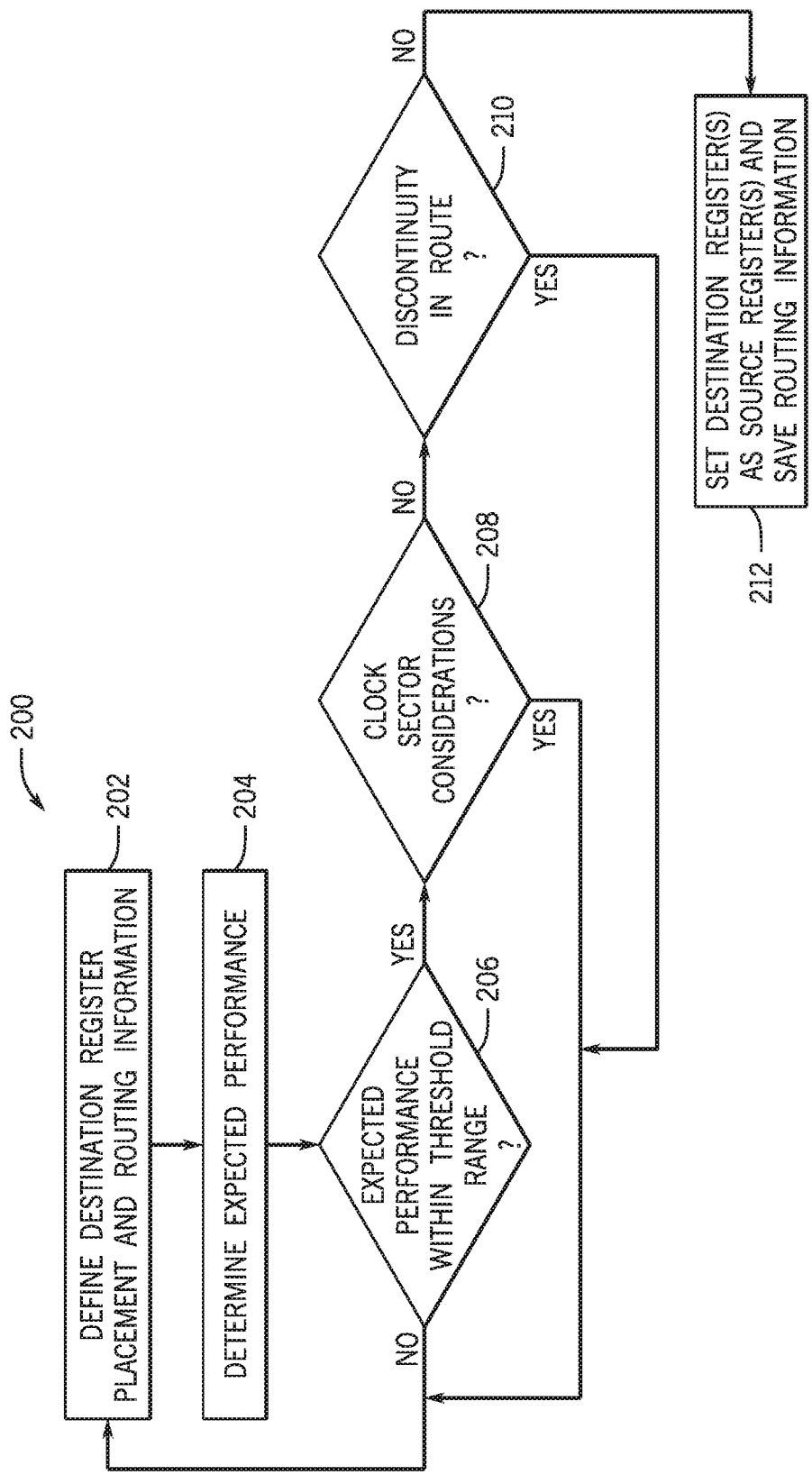
FIG. 11 is a flow diagram of a process for determining routing information and the placement of endpoints of a NoC, in accordance with an embodiment.

Now that several variations of NoCs (e.g., NoCs 150A-150D) have been introduced, the discussion will return to FIG. 6 and the process 100 to further explain how NoCs may be generated and why one of the NoCs 150A-150D may be generated (e.g., compared to another one of the NoCs 150A-150D). Continuing with the process 100, at process block 106, the computer system 18A may determine routing information and the placement of endpoints. For example, determining the placement of endpoints may include determining where other registers or register blocks should be location, and determining routing information includes determining a route (e.g., particular wires) between the endpoints and other endpoints, such as endpoints determined at process block 104. To help explain process block 106 in more detail, FIG. 11 is provided. In particular, FIG. 11 is a flow diagram of a process 200 for determining routing information and the placement of endpoints. In other words, the process 200 may be performed as process block 106 of the process 100. The process 200 may be performed by the computer system 18A, the cloud computing system 28, or a combination of the computer system 18A and the cloud computing system 28. In general, the process 200 includes defining destination register placement and routing information (process block 202), determining an expected performance based on defined register placement and routing information (process block 204), determining whether the expected performance is within a threshold range such as the target performance level threshold range (decision block 206), and defining destination register placement and routing information (process block 202) when it is determined that the expected performance is not within the threshold range. When it is determined that the expected performance is within the threshold range, the process 200 further includes determining whether there are any clock sector considerations (decision block 208) and defining destination register placement and routing information (process block 202) when it is determined that there are clock sector considerations to be made. When it is determined that there are not clock considerations to be made, the process 200 may also include determining whether there are any discontinuities in a route (decision block 210) and defining destination register placement and routing information (process block 202) when it is determined that there is a discontinuity in the route. When it is determined that there is no discontinuity in the route, the process 200 may also include setting the destination registers as source registers and saving routing information (process block 212).

At process block 202, the computing system 18A may define destination register placement and routing information. Defining destination register placement may include determining potential locations for registers or groups of registers (e.g., register blocks) to be included in NoC. For example, in the context of FIG. 6, defining destination register placement may include determine registers, such as register block 156D, that are close to the rib 154. Determining routing information includes determining the route between an existing endpoint (e.g., the rib 154 or a portion thereof (e.g., a portion of the programmable logic 48 included in the rib 154)) and a potential destination register. The routing information may, for example, include a number of wires to be included in a route between two registers. Furthermore, the computing system 18A may define destination register placement and routing information based on data included in the memory device(s) 32 of the cloud computing system 28. For example, destination register placement and routing information may be determined based on predefined locations and fixed routes included in the memory device(s) 32 that may be chip-specific and/or application-specific.

At process block 204, the computing system 18A may determine an expected performance based on defined register placement and routing information. In other words, based on the location of the destination registers and the wires included in a particular route, the computing system 18A may determine a performance expected to occur, such as a speed at which data may be transmitted along the route. The computing system 18A may utilize information regarding the integrated circuit device 12A (e.g., stored on the memory device(s) of the cloud computing system 28) to make such a determination.

At decision block 206, the computing system 18A may determine whether the expected performance is within a threshold range. For example, the threshold range may be the target performance level threshold range discussed above. When the computing system 18A determined that the expected performance is not within the threshold range (e.g., performing below the range or above the range), the computing system 18A may return to process block 202 and define new destination register placement and routing information. For example, the computing system 18A may adjust a position of the destination registers, modify a route between endpoints (e.g., endpoints estimated at process block 104) and the destination registers, or both. For example, if the expected performance is determined to be too slow (e.g., slower than a minimum speed defined by the target performance level threshold range), the computing system 18A may move destination registers closer to previously set endpoints (e.g., source points or source registers). As another example, if the expected performance is too fast (e.g., faster than a maximum speed defined by the target performance level threshold range), the computing system 18A may move destination registers fathers away from previously set endpoints.

Figure 12:
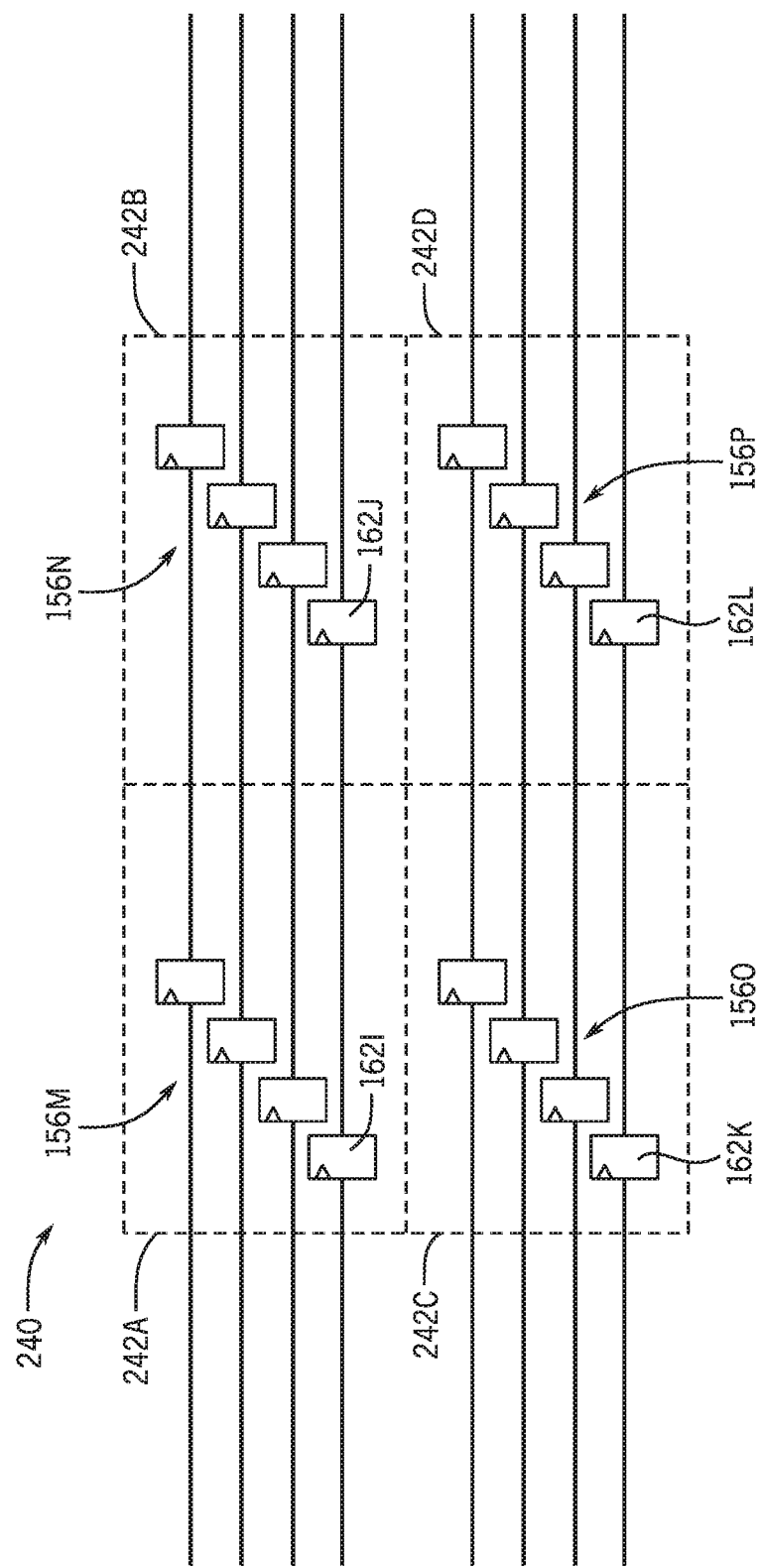
FIG. 12 is a block diagram of a portion of a NoC with register blocks located in several clock sections, in accordance with an embodiment.

If at decision block 206 the computing system 18A determines that the expected performance is within the threshold range, at decision block 208, the computing system 18A may determine whether there are clock sector considerations to be accounted for. To help illustrate, FIG. 12 is provided. In particular, FIG. 12 is a block diagram of a portion 240 of a NoC (e.g., a NoC design) that includes register blocks 156M, 156N, 156O, 156P that each include registers (e.g., register 162I in register block 156M, register 162J in register block 156N, register 162K in register block 156O, register 162 in register block 156P) and are located in respective clock sections 242A, 242B, 242C, 242D. As registers are placed while performing the process 200 (or process 100), such as when destination registers are initially placed or when destination registers are moved (e.g., due to expected performance being outside of the threshold range), the registers that are included in the same group of registers (e.g., a register block), may be placed across more than one clock sector. When registers of a register block are included in more than one clock sector, the computing device 18A may determine that clock sectors considerations that have not been accounted for. For example, when registers of a register block are included in multiple block sectors, clock skew may occur. Referring back to FIG. 11, if at decision block 208 the computer system 18A determines that there are clock considerations (e.g., registers of register blocks included in more than one block), the computer system 18A may return to process block 202 and define new destination register placement and routing information. For example, the computing system 18A may adjust a position of the destination registers, modify a route between endpoints (e.g., endpoints estimated at process block 104) and the destination registers, or both.

If at decision block 208 the computer system 18A determines that there are not clock sector considerations to be accounted for (e.g., if registers of registers blocks are located within the same clock sector, as shown in FIG. 12), at decision block 210 the computer system 18A may determine whether there are any discontinuities in the route(s). For example, the integrated circuit device 12A may include areas that cannot be programmed by the developer, such as hard IP blocks or portions of the integrated circuit device 12A that include logic that cannot be modified. The computer system 18A may determine whether there any discontinuities in the routing by determining whether the routing would pass through areas of the integrated circuit device 12A that cannot be programmed by the developer. If at decision block 210 the computing system 18A determines that there are any discontinuities in the route(s), the computing system 18A may return to process block 202 and define new destination register placement and routing information. For example, the computing system 18A may adjust a position of the destination registers, modify a route between endpoints (e.g., endpoints estimated at process block 104) and the destination registers, or both.

Figure 13:
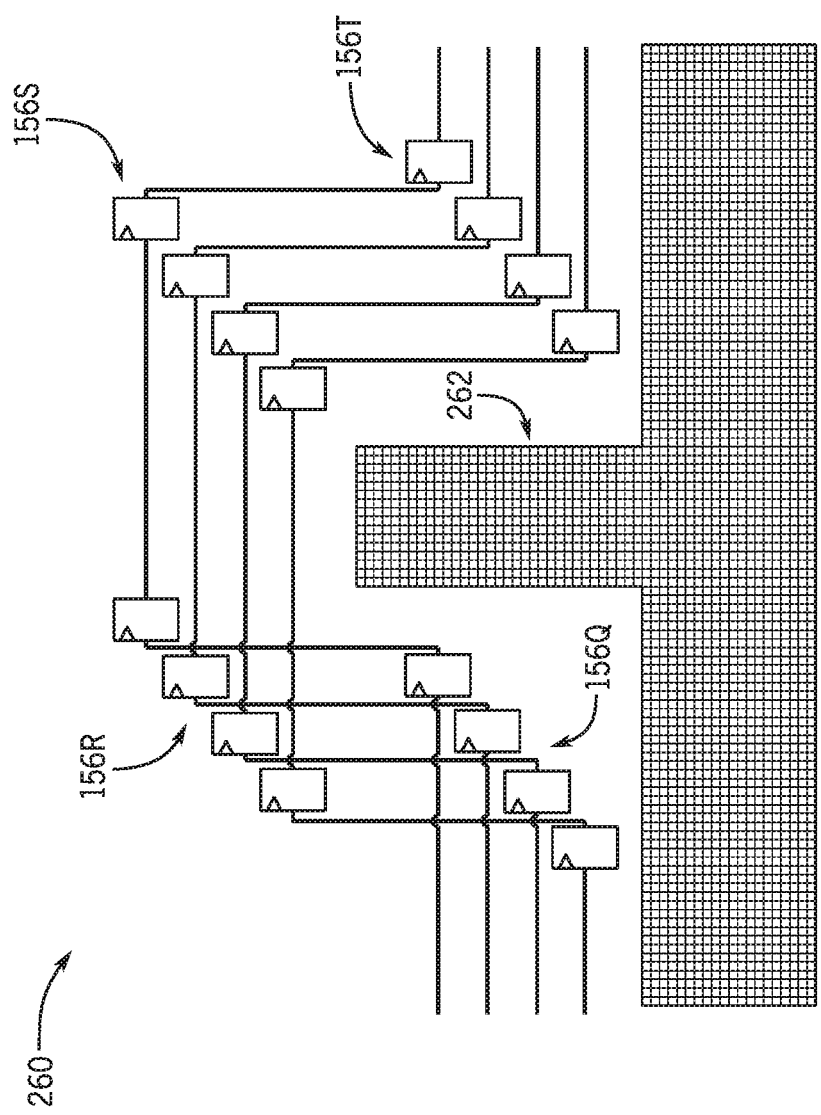
FIG. 13 is a block diagram of register blocks that are routed around an impassable area of an integrated circuit, in accordance with an embodiment.

To help illustrate, FIG. 13 is provided. In particular, FIG. 13 is a diagram illustrating register blocks 156Q, 156R, 156S, 156T that are routed around an impassable area 262 of the integrated circuit device 12A. The impassable area 262 may be a portions of the integrated circuit device 12A that cannot be modified (e.g., does not include programmable logic 48). During an initial placement of registers, register block 156T may have been placed in the location shown in FIG. 13, and a direct route from register block 156Q to register block 156T may have been generated. Such a route may have passed through the impassable area 262. During an implementation of the process 200, the computing system 18A may have determined that the route would pass through the impassable area 262 and performed actions to address the route passing through the impassable area 262. For example, the computing system 18A may have added register blocks 156R, 156S and routes from register block 156Q to register block 156R to register block 156S to register block 156T.

Figure 14:
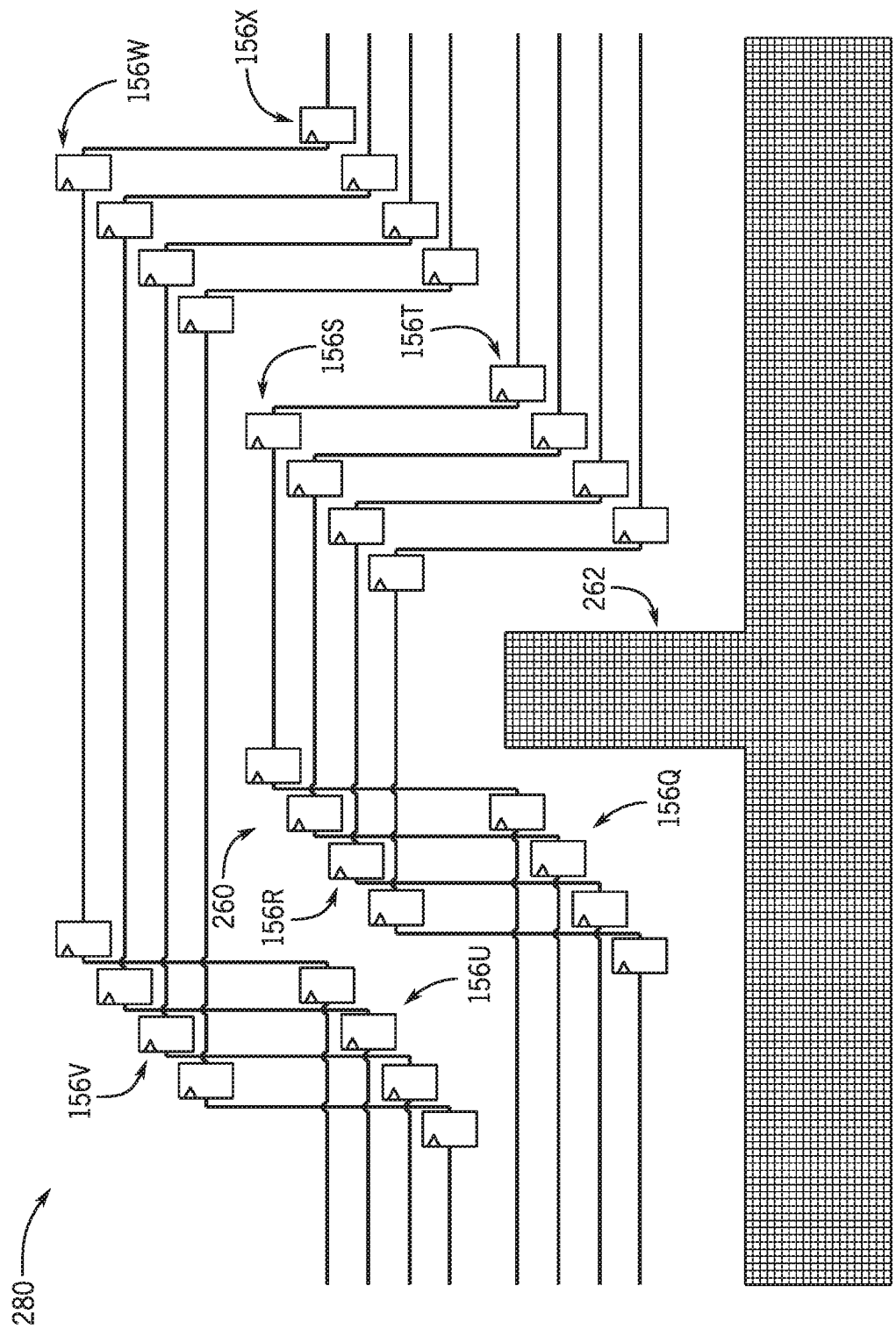
FIG. 14 is a block diagram of register blocks that are routed around other register blocks that have been routed around an impassable area of an integrated circuit, in accordance with an embodiment.

It should also be noted that the placement of destination registers or register blocks (and associated routing) may be made based on other registers or register blocks (and associated routes) that circumvent the impassable area 262. For example, FIG. 14 illustrates a diagram of a portion 280 of the integrated circuit device 12A that includes the portion 260 as well as register blocks 156U, 156V, 156W, 156X that are routed based on the register blocks 156Q, 156R, 156S, 156T. For example, because the register blocks 156Q, 156R, 156S, 156T have been placed to route around the impassable area 262, the register blocks 156Q, 156R, 156S, 156T and routing (e.g., wires) associated with the register blocks 156Q, 156R, 156S, 156T may be routed in a similar way.

Returning to FIG. 11 and the discussion of the process 200, if at decision block 210 the computing system 18A determines that there are no discontinuities in the route(s), at process block 212, the computing system 18A may set the destination registers as source registers and save the routing information. As will be discussed below with respect to the process 100, the computing system 18A may add more registers (e.g., destination registers) based on source registers. The computing system 18A may also determine routing between the source registers and destination registers.

It should be noted that while the process 200 is described as being performed by the computing system 18A, in some embodiments, the process 200 may be performed by the computing system 18A and the cloud computing system 28 in combination. For example, the computing system 18A may provide information regarding the integrated circuit device 12A, such as a model (e.g., specific chip) of the integrated circuit device 12A, as well as a target performance level and/or target performance level threshold range. The processing circuitry 30 of the cloud computing system 28 may perform operations of the process 200 to generate a NoC design for the integrated circuit device 12A based on historical information, predefined locations (e.g., of registers), and/or fixed routes associated stored on the memory device(s) 32. For example, the memory device(s) may include data or statistics regarding previous programs implemented on the integrated circuit device 12A or integrated circuit device 12B that are the same type of integrated circuit as the integrated circuit device 12A. The cloud computing system 28 may provide the NoC design to the processor(s) 16, and the NoC design may be implemented on the integrated circuit device 12A as described above. Furthermore, the process 200 may be performed by the computing systems 18B alone or in combination with the cloud computing system 28.

Additionally, it should be noted that, in other embodiments, rather than proceeding back to process block 202 based on decisions at decision blocks 206, 208, 210, the computer system 18A may adjust destination register placement, routing, or both, and then return to the most recently performed decision block. For example, if at decision block 208 the computer system 18A determines that there are clock sector considerations that have not yet been accounted for, the computer system 18A may modify the position of destination registers and then return to decision block 208.

Furthermore, while performing the process 200 or after performing the process 200, the computing system 18A may provide data associated with performing the process 200 to the cloud computing system 28. For example, data regarding registers (e.g., register blocks) and routes associated with registers, included registers and routes that are ultimately not implemented into a NoC, may be provided to the cloud computing system 28 and added to the memory device(s) 32. For instance, data regarding registers and routes associated with registers may respectively stored as chip-specific predefined locations and fixed routes that may be utilized to generate a NoC during other iterations of the process 200 or process 100.

Keeping the discussion of the process 200 in mind but returning to FIG. 5, at decision block 108, the computing system 18A may determine whether each endpoint and route has been determined. In other words, the computing system 18A may determine whether a complete NOC that will operate in accordance with a designer's desired performance has been designed. For example, the computing system 18A may determine whether more registers or routes should be added to a NoC design (e.g., NoCs 150A-150D). If the computing system 18A determines that each route and endpoint has not been determined, the computing system may return to process block 106 and determine additional routing information, the placement of additional endpoints, or both. That is, many iterations of the process 200 or portions thereof may be performed to develop a NoC, such as one of the NoCs 150A-150D. For example, while determining register placement and routing information in a NoC, the computing system 18A may make adjustments to the locations of registers and/or modify which wires are to be utilized until the expected performance associated with destination registers (e.g., a register block) is within the target performance level threshold range, any clock considerations have been accounted for, and there are no route discontinuities (e.g., there were no discontinuities or the discontinuities have been accounted for). The registers or register blocks may be described as being added in "layers" in which destination registers are placed based on the locations of other registers that have been set (e.g., source registers). After the placement of destination registers is confirmed, the destination registers may be saved as source registers, and associated route information may also be saved. More layers of registers may be added until a NoC is complete. In other words, at decision block 108, the computing system 18A may determine whether a NoC design is complete.

If at decision block 108 the computing system 18A determines that each endpoint (e.g., each register or register block) and associated routes have been determined, at process block 110, the computing system 18A may receive a circuit design. For example, the circuit design may be a high-level programming language description of a hardware implementation for the integrated circuit device 12A written by designer using the design software 14A. At process block 112, the computing system 18A may generate a program or bitstream, such as the program (bitstream) 24. For instance, as noted above, the compiler 22A may generate the program 24, which may be a low-level circuit design that describes hardware implementations to be stored on the integrated circuit device 12A.

A NoC, such as one of the NoCs 150A-150D may be described in the program 24. However, it should be noted that the NoC, including registers utilized as well as routing information (e.g., particular wires utilized between registers) may be defined before compiling. In other words, a design for a NoC may be made independent of, as well as before, compiling is performed. When generating the program 24, the computing system 18A may program the programmable elements 50 of the programmable logic 48 of the integrated circuit device 12A based on a NoC design (e.g., a NoC to be implemented on the integrated circuit device 12A). For example, the computing system 18A and/or compiler 22 may determine portions of the programmable logic 48 that will not be utilized for a NoC. The program 24, when provided to the integrated circuit device 12A, may only cause portions of the programmable logic 48 that will not be utilized for the NoC to be programmed to perform operations described by the high-level programming language description provided to the compiler 22.

At process block 114, the computing system 18A may cause the integrated circuit device 12A to be programmed.

For example, the computing system 18A may cause a hardware implementation described by the program 24 to be implemented on the integrated circuit device 12A by sending the program 24 to the integrated circuit device 12A. As noted above, the program 24 may include instructions for a NoC. Accordingly, a NoC may be implemented onto the programmable logic 48 of the integrated circuit device 12A at process block 114.

It should be noted that while the process 100 is described as being performed by the computing system 18A, in some embodiments, the process 100 may be performed by the computing system 18A and the cloud computing system 28 in combination. For example, the computing system 18A may provide information regarding the integrated circuit device 12A, such as a model (e.g., specific chip) of the integrated circuit device 12A, as well as a target performance level and/or target performance level threshold range. The processing circuitry 30 of the cloud computing system 28 may generate a NoC design for the integrated circuit device 12A using historical information, predefined locations (e.g., of registers), and/or fixed routes associated stored on the memory device(s) 32. For example, the memory device(s) may include data or statistics regarding previous programs implemented on the integrated circuit device 12A or integrated circuit 12B that are the same type of integrated circuit as the integrated circuit device 12A. The cloud computing system 28 may provide the NoC design to the processor(s) 16, and the NoC design may be implemented on the integrated circuit device 12A as described above.

By performing the process 100 and process 200, the computing system 18A may design a device-specific and application-specific NoC as well as implement the NoC on the integrated circuit device 12A. For example, the techniques discussed above enable high-speed data transmission via wide busses that span relatively large distances across the integrated circuit device 12A. Furthermore, because NoCs may be designed and the locations of registers and datapaths may be set prior to compiling, a hardware implementation for performing a function (e.g., machine learning, encryption, etc.) described by the program 24 may take the NoC into account and cause portions of the programmable logic 48 to be utilized based on the NoC. Moreover, because the NoC may be determined independently from compiling, less time may be required for compiling compared to if the placement of logic elements utilized to make the NoC were determined during compilation.

Figure 15:
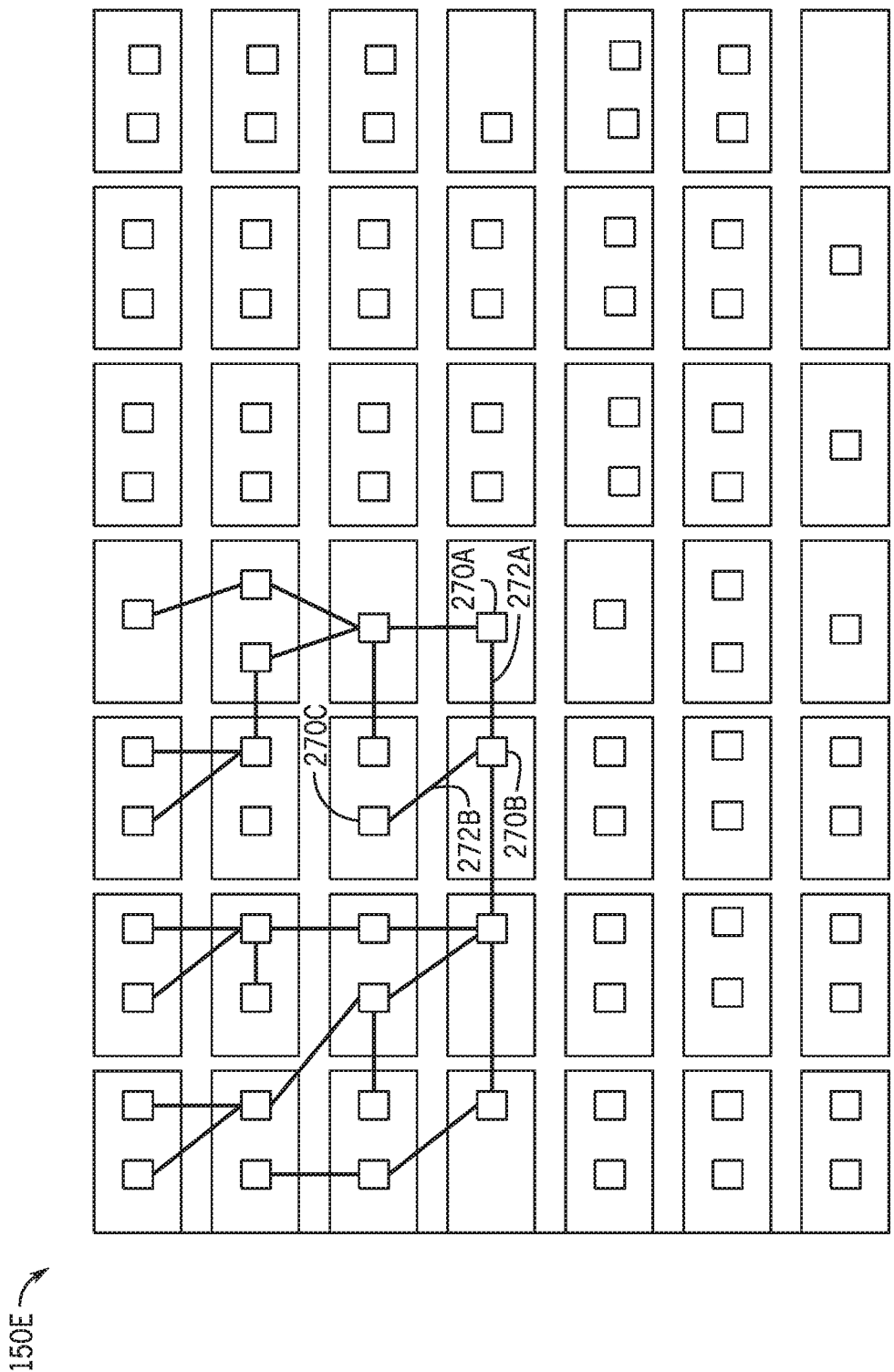
FIG. 15 is a block diagram of a NoC that includes direct datapaths, in accordance with an embodiment.

The discussion above provides several examples of NoCs that are generally regular in nature. For instance, the NoCs 150A-150D include patterns of registers and routes that are repeated because utilizing such a regularized structure enables large amounts of data to be sent quickly across the integrated circuit device 12A. However, in some cases, only a relatively small amount of data (e.g., several bits) may need to be routed. In such cases, utilizing a NoC 150A may not be as desirable as using a NoC that provides direct paths between sectors or portions of the programmable logic 48, such as particular accelerator functional units (AFUs) that are utilized to perform specific operations (e.g., as part of a larger function performed by the integrated circuit device 12A). With this in mind, FIG. 15 is a diagram of a NoC 150E that includes direct paths between various portions of the programmable logic 48 of the integrated circuit device 12A. For example, FIG. 15 illustrates endpoints 270 (e.g., endpoints 270A, 270B, 270C), which may include registers or register blocks, as well as routes 272 (e.g., routes 272A, 272B) between the endpoints 270.

The computing system 18A may generate the NoC 150E by performing the process 100 described above. For example, referring briefly to FIG. 5, the computing system 18A may receive that relatively small amounts of data will be communicated, a target performance level (e.g., speed) associated with the data, and information about the integrated circuit device 12A, such as hardware included in the integrated circuit device 12A (process block 102). Based on the integrated circuit device 12A and the desired speed of the NoC (e.g., NoC 150E), initial endpoints may be determined, such as endpoints depicted in FIG. 15. The computing system 18A may also determine routing (e.g., datapaths) between the endpoints as well as the placement of endpoints (process block 106), such as in the manner described above with respect to the process 200. However, in some embodiments, a different technique may be used.

Figure 16A:
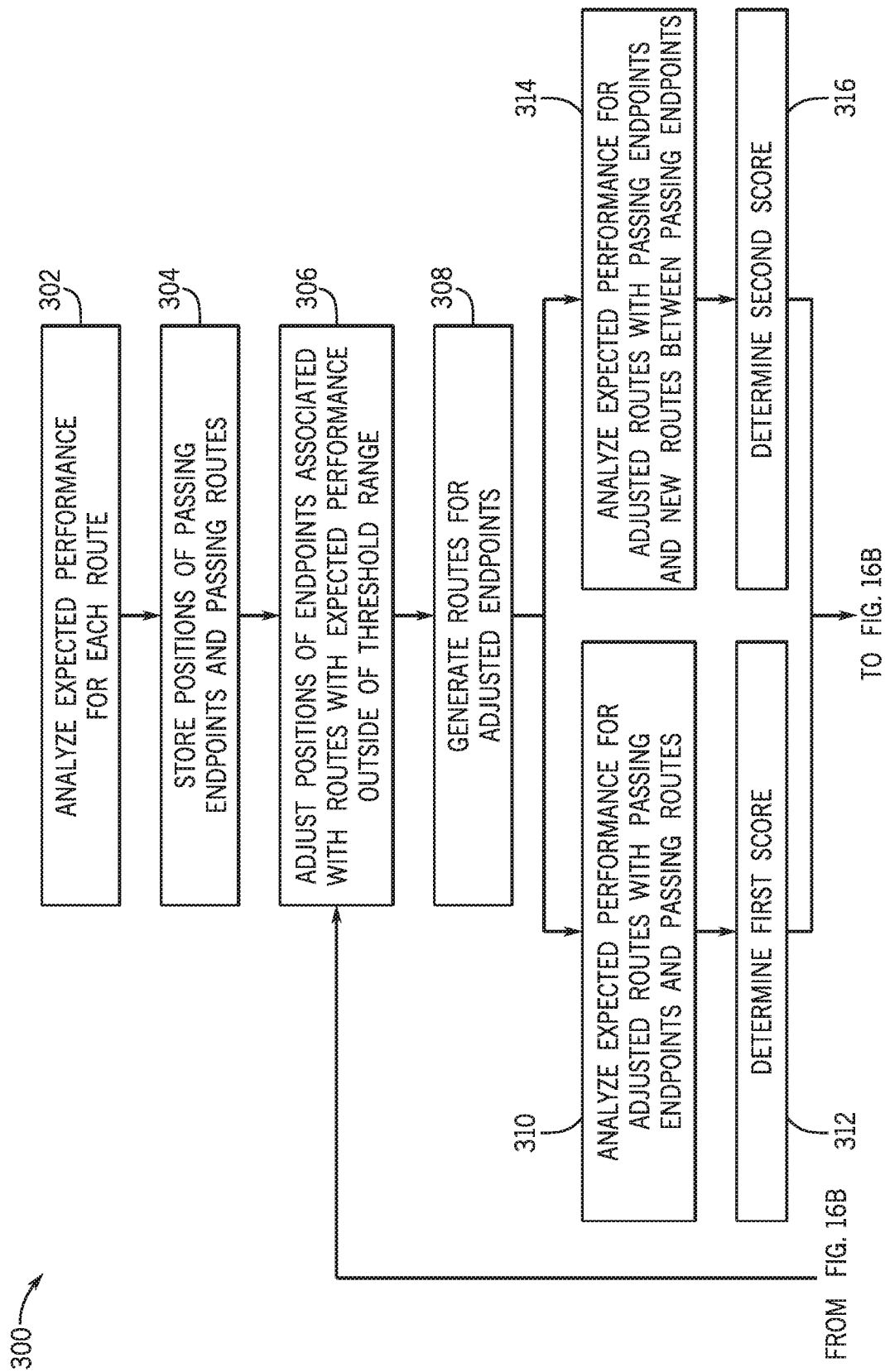
FIGS. 16A and 16B (hereinafter referred to as "FIG. 16") illustrate a flow diagram of a process for determining routing information and the placement of endpoints of a NoC, in accordance with an embodiment.
Figure 16B:
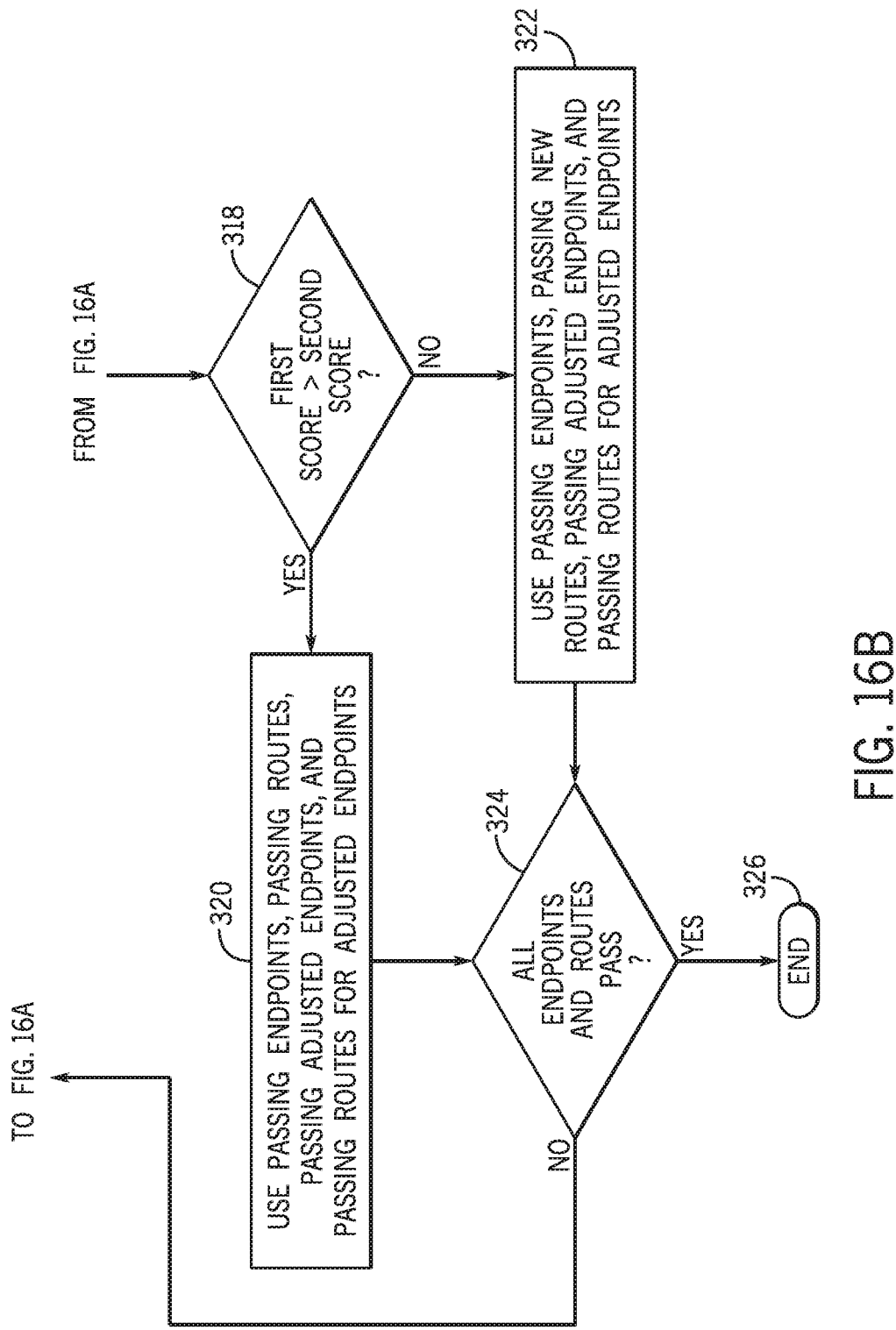

For example, FIG. 16 is a flow diagram of a process 300 for determining routing between endpoints and the placement of endpoints. While the process is described below as being performed by the computing system 18A, the process 300 may be performed by the computing systems 18A, 18B, the cloud computing system 28, or one or more of the computing systems 18A, 18B in combination with the cloud computing system 28. As described below, the process 300 generally includes analyzing an expected performance of each route (process block 302), adjusting positions of endpoints associated with routes having expected performances that are outside of a threshold range (process block 304), storing positions of passing endpoints and routes (process block 306), adjusting positions of endpoints associated with routes with expected performances outside of the threshold range (process block 308), generating routes for the adjusted endpoints (process block 310), analyzing expected performance for adjusted routes with both passing endpoints and routes associated with passing endpoints (process block 312), determining a first score based on the expected performance (process block 314), analyzing expected performance for adjusted routes with passing endpoints and new routes between passing endpoints (process block 316), determining a second score based on the expected performance (process block 318), determining whether the first score is greater than the second score (decision block 320), and using passing endpoints, passing routes, passing adjusted endpoints, and passing routes for adjusted endpoints (process block 322) when it is determined that the first score is greater than the second score. When it is determined that the first score is not greater than the second score, the process 300 may include using passing endpoints, passing new routes, passing adjusted endpoints, and passing routes for adjusted endpoints (process block 324). The process 300 may also include determining whether all endpoints and routes pass (decision block 326). When there are endpoints and/or routes that do not pass (e.g., performance outside of threshold range), the process 300 may include adjusting positions of endpoints associated with routes with expected performance outside of the threshold range (process block 308). When each endpoint and route passes, the process 300 may end (process block 328).

At process block 302, the computing system 18A may analyze the expected performance of each route. For example, using the endpoints determined at process block 104 of the process 100, the computing system 18A may determine whether an expected performance of each route (e.g., a speed) is within a threshold range, such as target performance level threshold range.

At process block 304, the computing system 18A may store positions of passing endpoints and passing routes, which includes routes that have expected performances within the target performance level threshold range and endpoints associated with such routes. At process block 306, the computing system 18A may adjust positions of endpoints associated with routes having expected performances that are outside of the target performance level threshold range. For instance, if a route (e.g., datapath) has an expected performance that is too slow (e.g., below a minimum value of the target performance level threshold range), the computing system 18A may move one or more endpoints associated with the route (e.g., closer to another endpoint). As another example, if an expected performance is too fast (e.g., above a maximum value of the target performance level threshold range), the computing system 18A may move one or more endpoints associated with the route (e.g., farther away from another endpoint).

At process block 308, the computing system 18A may generate routes for the endpoints that are modified at process block 306. At process block 310, the computing system 18A may analyze the expected performance for the adjusted routes (e.g., routes for adjusted endpoints) while also using passing endpoints and passing routes. In other words, the performance of routes in a potential NoC design that includes passing endpoints, passing routes, adjusted endpoints, and adjusted routes may be determined. At process block 312, the computing system 18A may determine a first score that is indicative of the analysis for each adjusted route and passing route. For example, the first score may be a numerical value indicative of a percentage of routes (e.g., adjusted routes and passing routes) that have expected performances within the target performance level threshold range. As another example, the first score may be a score that weight certain routes more heavily than others. For example, passing routes may be weighted less heavily than adjusted routes.

At process block 314, the computing system 18A may analyze the performance for the adjusted routes while also using passing endpoints and new routes between passing endpoints. That is, the performance of routes in a potential NoC design that includes the passing endpoints, new routes between the passing endpoints, adjusted endpoints, and adjusted routes may be determined. At process block 316, the computing system 18A may determine a second score indicative of the analysis for each route analyzed at process block 314. That is, the second score may be determined in a manner similar to the first score.

At decision block 318, the computing system 18A may determine whether the first score is greater than the second score. In other words, at decision block 318, the computing system 18A may determine whether the analysis associated with process block 310 or the analysis associated with process block 314 provides better results. If the computing system 18A determines that the first score is greater than the second score, at process block 320, the computing system 18A may use the passing endpoints, passing routes, passing routes for adjusted endpoints (e.g., routes between adjusted endpoints having expected performances within the target performance level threshold range), and passing adjusted endpoints (e.g., adjusted endpoints associated with passing adjusted routes).

However, if the computing system 18A determines that the first score is not greater than the second score, at process block 322, the computing system 18A may use the passing endpoints, passing new routes (e.g., new routes with expected performance levels within the target performance level threshold range), passing routes for adjusted endpoints (e.g., routes between adjusted endpoints having expected performances within the target performance level threshold range), and passing adjusted endpoints (e.g., adjusted endpoints associated with passing adjusted routes).

Proceeding from process block 320 or process block 322 (based on decision block 318), at decision block 324, the computing system 18A may determine whether the endpoints and routes being used are associated with expected performances that are within the target performance level threshold range. In other words, the computing system 18A may determine whether there are any routes that have expected performance levels that are not within the target performance level threshold range. If the computing system 18A determines that each route has an expected performance level that falls within the target performance level, the process 300 may end, as indicated by process block 326.

However, if the computing system 18A determines that there is a route that has an expected performance that is not within the target performance level threshold range, the computing system 18A may return to process block 306 and adjust the positions of endpoints associated with the route that has an expected performance not within the target performance level threshold range. In other words, the computing system 18A may iterate through portions of the process 300 several times until each route has an expected performance that is within the target performance level threshold range.

By utilizing the process 300, the computing system 18A may develop NoCs, such as NoC 150E that has routes (e.g., datapaths) that are more direct than those of the regularized NoCs discussed above. However, it should be noted that NoCs such as the NoC 150E can be used in combination with other NoCs (e.g., NoCs 150A-150D). In other words multiple NoCs may be utilized, such as one regularized NoC that enables large amounts of data to be sent quickly and another NoC that is utilized to send relatively small amounts of data between specific portions of the integrated circuit device 12A (e.g., between two AFUs, registers, or register blocks).

In some embodiments, the process 300 may include addition operations. For example, the process 300 may also include operations analogous to decision blocks 208, 210 of the process 200. That is, while performing the process 300, the computing system 18A may take clock sector considerations into account as well as consider whether any routes would pass through impassable areas of the integrated circuit device 12A. As another example, more the process 300 may include unlocking routing for all endpoints (e.g., at a specific point during performance of the process 300 or at random), which may enable new routes to be generated to determine whether other routes may be better than routes currently being used. As yet another example, the process 300 may include determining endpoints related to distribution channels or other local routes. However, before discussing this in more detail with respect to FIG. 17, it should be noted that, in some embodiments, the process 300 may be performed as an alternative to the process 200, even for generating regularized NoCs such as NoCs 150A-150D. It should also be noted that, after performing the process 300, the computing system 18A may proceed to decision block 108 of the process 100 and proceed to continue through operations of the process 100 as discussed above with respect to FIG. 5.

Figure 17:
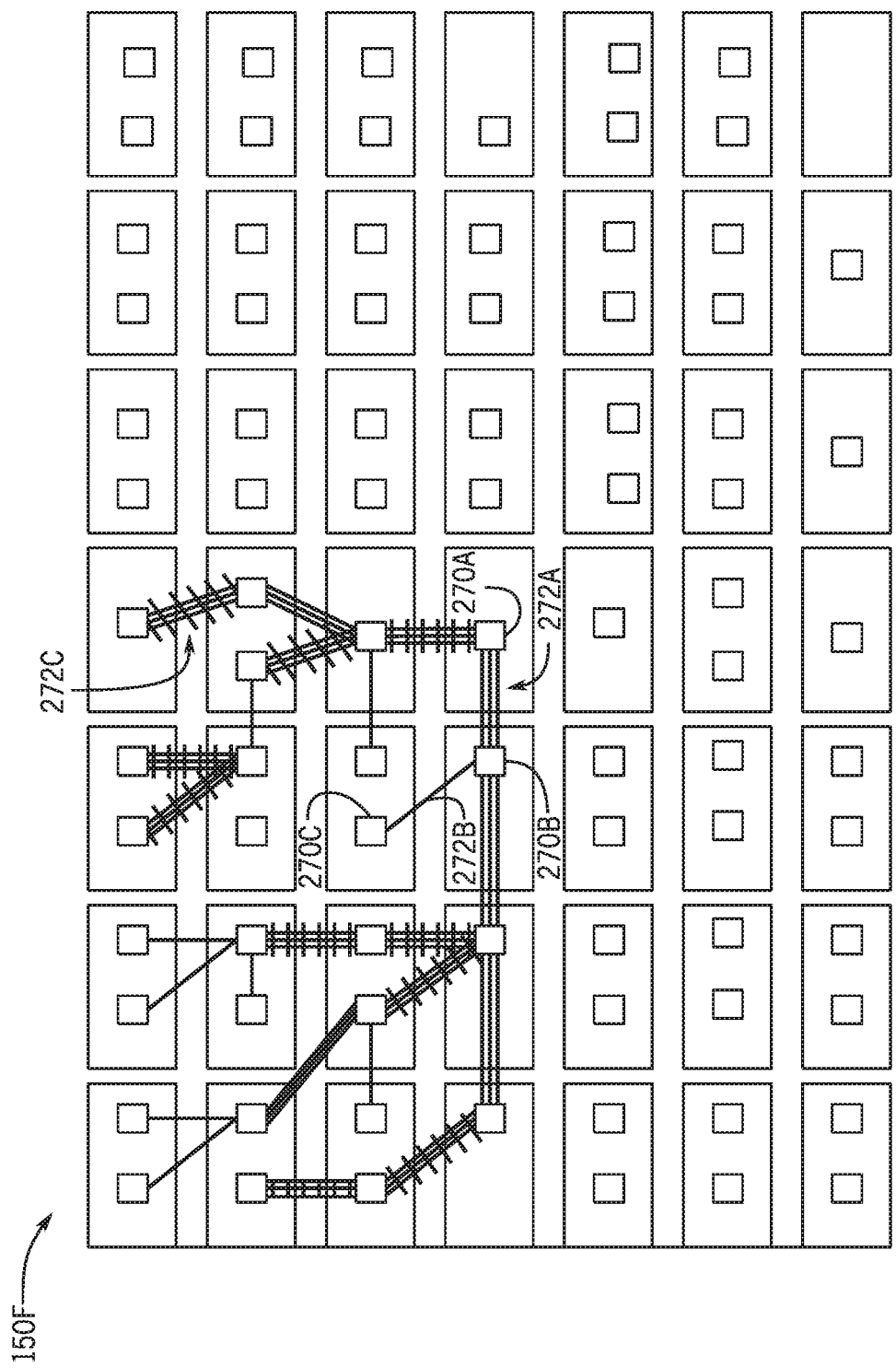
FIG. 17 is a block diagram of another NoC that includes direct datapaths, in accordance with an embodiment.

Continuing with the drawings, FIG. 17 is a diagram of a NoC 150F, which is an embodiment of the NoC 150E that includes additional datapaths. As mentioned above, the process 300 may include determining endpoints related to distribution channels or other local routes. For example, while performing the process 300, the computing system 18A may define additional endpoints and/or routes based on stored endpoints and generate additional routes. For example, as shown in FIG. 17, route 272A may be modified (compared to FIG. 15) to provide wider data distribution (e.g., by adding more wires). That is, a wider data bus may be utilized between two endpoints, such as endpoints 270A, 270B. In this example, the increased bandwidth of the route 272A may have been increased to enable the route 272A to better transmit data (e.g., to other endpoints). However, routes may also be added for purposes such as data distribution (e.g., within a sector or portion of the programmable logic 48, which is illustrated by the route 272C.

Accordingly, the NoCs discussed herein and techniques for generating and implementing the NoCs discussed herein enable high-speed data transmission via wide busses that span relatively large distances across the integrated circuit device 12A. Additionally, NoCs having datapaths (e.g., routes) that enable desired amounts of data to be transmitted at a target performance level (e.g., speed) or within a target performance level threshold range may eliminate chokepoints or bottlenecks that can be experienced with other NoCs. Furthermore, because NoCs may be designed and the locations of registers and datapaths may be set prior to compiling, a hardware implementation for performing a function (e.g., machine learning, encryption, etc.) described by the program 24 may take the NoC into account and cause portions of the programmable logic 48 to be utilized based on the NoC. Moreover, because the NoC may be determined independently from compiling, less time may be required for compiling compared to if the placement of logic elements utilized to make the NoC were determined during compilation.

Figure 18:
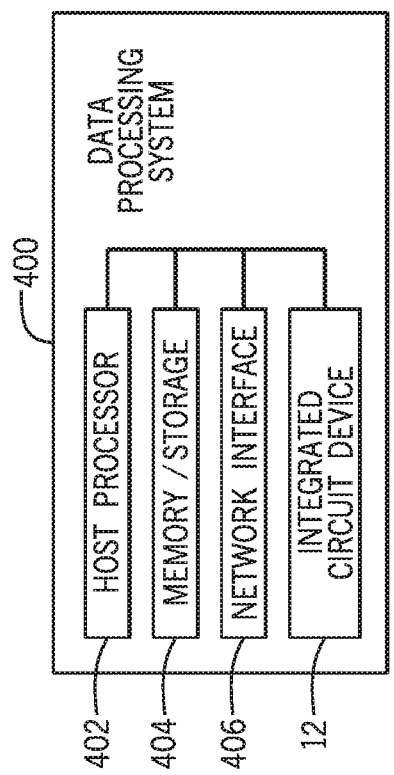
FIG. 18 is a block diagram of a data processing system, in accordance with an embodiment.

With the foregoing in mind, the integrated circuit device 12 (e.g., integrated circuit device 12A) may be a part of a data processing system or may be a component of a data processing system that may benefit from use of the techniques discussed herein. For example, the integrated circuit device 12 may be a component of a data processing system 400, shown in FIG. 18. The data processing system 400 includes a host processor 402, memory and/or storage circuitry 404, and a network interface 406. The data processing system 400 may include more or fewer components (e.g., electronic display, user interface structures, application specific integrated circuits (ASICs)).

The host processor 402 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 400 (e.g., to perform machine learning, video processing, voice recognition, image recognition, data compression, database search ranking, bioinformatics, network security pattern identification, spatial navigation, or the like). The memory and/or storage circuitry 404 may include random access memory (RAM), read-only memory (ROM), one or more hard drives, flash memory, or the like. The memory and/or storage circuitry 404 may be considered external memory to the integrated circuit device 12 and may hold data to be processed by the data processing system 400 and/or may be internal to the integrated circuit device 12. In some cases, the memory and/or storage circuitry 404 may also store configuration programs (e.g., bitstream) for programming a programmable fabric of the integrated circuit device 12. The network interface 406 may permit the data processing system 400 to communicate with other electronic devices. The data processing system 400 may include several different packages or may be contained within a single package on a single package substrate.

In one example, the data processing system 400 may be part of a data center that processes a variety of different requests. For instance, the data processing system 400 may receive a data processing request via the network interface 406 to perform machine learning, video processing, voice recognition, image recognition, data compression, database search ranking, bioinformatics, network security pattern identification, spatial navigation, or some other specialized task. The host processor 402 may cause a programmable logic fabric of the integrated circuit device 12 to be programmed with a particular accelerator related to requested task. For instance, the host processor 402 may instruct that configuration data (bitstream) be stored on the memory and/or storage circuitry 404 or cached in sector-aligned memory of the integrated circuit device 12 to be programmed into the programmable logic fabric of the integrated circuit device 12. The configuration data (bitstream) may represent a circuit design for a particular accelerator function relevant to the requested task.

The processes and devices of this disclosure may be incorporated into any suitable circuit. For example, the processes and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

Moreover, while the process operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A computer-implemented method for programming a network-on-chip (NoC) onto an integrated circuit, the method comprising:
   determining a first portion of a plurality of registers to potentially be included in a NoC design;
   determining routing information regarding datapaths between registers of the first portion of the plurality of registers;
   determining an expected performance associated with the first portion of the plurality of registers;
   determining whether the expected performance is within a threshold range;
   including the first portion of the plurality of registers and the datapaths in the NoC design based on determining that the expected performance is within the threshold range, wherein the plurality of registers comprises:
      a second portion of the plurality of registers configured to route data vertically away from a data source; and
      a third portion of the plurality of registers configured to route data horizontally away from the data source;
   receiving a program design associated with a function to be performed by the integrated circuit; and
   generating instructions configured to cause circuitry corresponding to the NoC design to be implemented on the integrated circuit by compiling, based on the NoC design, the program design to generate a hardware implementation on the integrated circuit for the function and the NOC design.

2. The computer-implemented method of claim 1, wherein the first portion of the plurality of registers are selected from a library comprising potential register locations specific to the integrated circuit.

3. The computer-implemented method of claim 2, wherein the datapaths are selected from a plurality of chip-specific datapaths included in the library.

4. The computer-implemented method of claim 1, comprising moving one or more locations of registers of the first portion of the plurality of registers, altering a portion of the datapaths, or both based on determining that the expected performance is not within the threshold range.

5. The computer-implemented method of claim 1, comprising:
   determining whether the first portion of the plurality of registers includes registers that are located in more than one clock sector; and
   based on upon determining that the first portion of the plurality of registers includes registers that are located in more than one clock sector, moving one or more registers of the first portion of the plurality of registers so that each register of the first portion of the plurality of registers is included in a single clock sector.

6. The computer-implemented method of claim 1, wherein the third portion of the plurality of registers is disposed perpendicular to the second portion of the plurality of registers.

7. The computer-implemented method of claim 1, comprising:
   determining whether any of the datapaths are routed through an impassable area of the integrated circuit; and
   after determining that at least one of the datapaths is routed through the impassable area, altering a portion of the datapaths to run around the impassable area.

8. The computer-implemented method of claim 7, comprising altering one or more locations of a second plurality of registers of the plurality of registers based on altering the portion of the datapaths to run around the impassable area.

9. The computer-implemented method of claim 1, comprising:
   receiving desired performance information regarding the NoC design; and
   determining the first portion of a plurality of registers and the routing information based on the desired performance information.

10. The computer-implemented method of claim 1, wherein the integrated circuit comprises a programmable logic device.

11. A non-transitory computer-readable medium comprising instructions that, when executed, are configured to cause one or more processors to:
   receive data regarding an integrated circuit and data regarding performance characteristics for a network-on-chip (NoC) to be designed;
   select source points and endpoints for the NoC based on the data regarding the integrated circuit and the data regarding performance characteristics for the NoC;
   determine routes between the source points and the endpoints;
   determine whether an expected performance level associated with the routes is within a threshold range of a performance level defined by the performance characteristics;
   include the endpoints and the routes in the NoC;
   receive a program design associated with a function to be performed by the integrated circuit; and
   generate instructions configured to cause circuitry corresponding to the NoC to be implemented on the integrated circuit by compiling, the program design to generate a hardware implementation on the integrated circuit for the function and the NOC, wherein the NOC, when implemented on the integrated circuit, comprises:
      a first plurality of registers of the integrated circuit configured to route data vertically away from a data source; and
      a second plurality of registers of the integrated circuit configured to route data horizontally away from the data source.

12. The non-transitory computer-readable medium of claim 11, wherein the instructions are configured to cause the one or more processors to:
   include the endpoints in the NoC comprises setting the endpoints as source points;
   determine second endpoints for the NoC based on the endpoints;
   determine routes between the endpoints and the second endpoints;
   determine second routes between the endpoints and the second endpoints; and
   include the second endpoints and the second routes in the NoC.

13. The non-transitory computer-readable medium of claim 12, wherein the instructions are configured to cause the one or more processors to:
   move the endpoints closer to the source points based on determining that the expected performance level is slower than a minimum speed defined by the threshold range; and
   move end endpoints farther from the source points based on determining that the expected performance level is faster than a maximum speed defined by the threshold range.

14. The non-transitory computer-readable medium of claim 11, wherein the instructions are configured to cause the one or more processors to include the endpoints and the routes in the NoC based on determining that the expected performance level is within threshold range.

15. The non-transitory computer-readable medium of claim 11, wherein the instructions are configured to cause the one or more processors to select the routes from the data regarding the integrated circuit based on the data regarding performance characteristics for the NoC.

16. The non-transitory computer-readable medium of claim 11, wherein the endpoints correspond to a portion of the first plurality of registers of the integrated circuit, a portion of the second plurality of registers of the integrated circuit, or both.

17. The non-transitory computer-readable medium of claim 11, wherein the integrated circuit comprises a programmable logic device.

18. An integrated circuit configured to:
receive instructions regarding a NoC design, wherein the instructions are generated by compiling, a program design associated with a function to be performed by the integrated circuit; and
implement, based on the instructions, a hardware implementation for the function and circuitry corresponding to the NoC design, wherein the NoC design is determined by:
determining a first portion of a plurality of registers to potentially be included in the NoC design;
determining routing information regarding datapaths between registers of the first portion of the plurality of registers;
determining an expected performance associated with the first portion of the plurality of registers;
determining whether the expected performance is within a threshold range; and
including the first portion of the plurality of registers and the datapaths in the NoC design after determining that the expected performance is within the threshold range, wherein the plurality of registers comprises:
a second portion of the plurality of registers configured to route data vertically away from a data source; and
a third portion of the plurality of registers configured to route data horizontally away from the data source.

19. The integrated circuit of claim 18, comprising a programmable logic device.

20. The integrated circuit of claim 19, wherein the programmable logic device comprises a field programmable gate array (FPGA).

* * * * *